(12) United States Patent
Ma et al.

(10) Patent No.: US 11,288,838 B2
(45) Date of Patent: Mar. 29, 2022

(54) IMAGE PROCESSING METHOD AND APPARATUS

(71) Applicants: Beijing BOE Optoelectronics Technology Co., Ltd., Beijing (CN); BOE TECHNOLOGY GROUP CO., LTD., Beijing (CN)

(72) Inventors: Fuqiang Ma, Beijing (CN); Jiankang Sun, Beijing (CN); Gang Li, Beijing (CN); Hongzhen Xue, Beijing (CN); Zehua Dong, Beijing (CN)

(73) Assignees: Beijing BOE Optoelectronics Technology Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 139 days.

(21) Appl. No.: 16/531,105

(22) Filed: Aug. 4, 2019

(65) Prior Publication Data

US 2020/0226781 A1 Jul. 16, 2020

(30) Foreign Application Priority Data

Jan. 11, 2019 (CN) .......................... 201910027320.9

(51) Int. Cl.
*G06T 7/73* (2017.01)
*G06T 7/246* (2017.01)

(52) U.S. Cl.
CPC .............. *G06T 7/74* (2017.01); *G06T 7/248* (2017.01); *G06T 2207/30204* (2013.01)

(58) Field of Classification Search
CPC . G06T 7/74; G06T 7/248; G06T 2207/30204; G06T 7/277;

(Continued)

(56) References Cited

U.S. PATENT DOCUMENTS 10,121,251 B2* 11/2018 Urban ..................... G06T 7/248
2008/0137940 A1* 6/2008 Kakinami ............... G06T 7/593
382/154

FOREIGN PATENT DOCUMENTS

CN 201374082 Y 12/2009
CN 102867311 A 1/2013
(Continued)

OTHER PUBLICATIONS

Wang et al., Moving Target Detection and Tracking Based on Pyramid Lucas-Kanade Optical Flow, IEEE 978-1-5384-4991-6/18, pp. 66-69. (Year: 2018).*

(Continued)

*Primary Examiner* — Ishrat I Sherali
(74) *Attorney, Agent, or Firm* — Thomas | Horstemeyer, LLP

(57) ABSTRACT

An image processing method and an image processing includes, when a current frame contains a target picture, taking the current frame as a reference frame for tracking and taking a set of matching points in the current frame, which match the target picture as an initial set of tracking points, to perform tracking of the target picture; obtaining a next frame and determining a set of tracking points of the next frame based on the initial set of tracking points; determining whether the number of tracking points in the set of tracking points is less than a first preset threshold; and, when the number of tracking points in the set of tracking points is less than the first preset threshold, determining supplementary tracking points and adding the supplementary tracking points to the set of tracking points.

17 Claims, 13 Drawing Sheets

(58) Field of Classification Search
CPC ............. G06T 2207/20016; G06T 7/33; G06T 2207/10016; G06T 7/246
USPC ........................................................ 382/103
See application file for complete search history.

(56) References Cited

FOREIGN PATENT DOCUMENTS

| | | | |
|---|---|---|---|
| CN | 103902982 A | | 7/2014 |
| CN | 104077596 A | | 10/2014 |
| CN | 104915673 A | * | 9/2015 |
| CN | 104966307 A | | 10/2015 |
| CN | 106447643 A | | 2/2017 |
| CN | 106951551 A | * | 7/2017 |
| CN | 107590453 A | | 1/2018 |
| CN | 108563777 A | | 9/2018 |
| CN | 108647307 A | | 10/2018 |

OTHER PUBLICATIONS

Jianbo et al., Moving Target Tracking Algorithm Based on Scale Invariant Optical Flow, 2016 IEEE 978-1-5090-2535-0/16, DOI 10.11/09/ICISCE.2016.107, pp. 468-472. (Year: 2016).*
1st Office Action dated Aug. 20, 2020 for Chinese Patent Application No. 201910027320.9.

* cited by examiner

IMAGE PROCESSING METHOD AND APPARATUS

CROSS-REFERENCE TO RELATED APPLICATIONS

The present application claims the benefit of and priority to Chinese Patent Application No. 201910027320.9 filed Jan. 11, 2019, the entire contents of which are incorporated herein by reference.

TECHNICAL FIELD

The present disclosure relates to the field of augmented reality (AR) technologies and, in particular, to an image processing method and an image processing apparatus for augmented reality.

BACKGROUND

In recent years, with the rapid development of mobile devices, the popularity of smart phones and the like has rapidly increased, so mobile-based AR technology has become a research hotspot. AR technology can realize the fusion of virtual information and real scenes in a display, which can supplement and enrich the visual scene information for the user and can be widely used in entertainment, industry, military, and other industries. The recognition-based AR technology usually needs to recognize a specifically marked image or a natural image, and then, implements tracking rendering of the target image, so that it is required to detect and track the scene in real time.

It should be noted that the information disclosed in the Background section above is only for enhancement of understanding of the background of the present disclosure, and thus, may include information that does not constitute prior art known to those of ordinary skill in the art.

SUMMARY

An object of the present disclosure is to provide an image processing method.

According to an aspect of the present disclosure, an image processing method is provided, including:

when a current frame contains a target picture, taking the current frame as a reference frame for tracking, taking a set of matching points in the current frame which match the target picture as an initial set of tracking points, to perform tracking of the target picture;

continuing to obtain a next frame, and determining a set of tracking points of the next frame based on the initial set of tracking points;

determining whether the number of tracking points in the set of tracking points is less than a first preset threshold; and when the number of tracking points in the set of tracking points is less than the first preset threshold, determining supplementary tracking points and adding the supplementary tracking points to the set of tracking points.

According to an aspect of the present disclosure, an image processing apparatus is provided, including:

a first tracking module configured to, when a current frame contains a target picture, take the current frame as a reference frame for tracking, take a set of matching points in the current frame which match the target picture as an initial set of tracking points, to perform tracking of the target picture;

a second tracking module configured to continue to obtain a next frame, and determine a set of tracking points of the next frame based on the initial set of tracking points;

a determining module configured to determine whether the number of tracking points in the set of tracking points is less than a first preset threshold; and a supplementing module configured to, when the number of tracking points in the set of tracking points is less than the first preset threshold, determine supplementary tracking points and add the supplementary tracking points to the set of tracking points.

According to an aspect of the present disclosure, an image processing apparatus is provided, including:

a processor; and a memory storing program instructions executable by the processor;

wherein the processor is configured to perform the method described above.

In the technical solution provided by the embodiment of the present disclosure, if a current frame contains a target picture, the frame may be regarded as a frame that first recognizes the target picture, the current frame may be taken as the reference frame for tracking, and a set of matching points of the current frame is taken as the initial set of tracking points to track the target picture. When tracking the next frame after the current frame, it is determined whether the number of tracking points in the set of tracking points is less than a first preset threshold. If the number of tracking points in the set of tracking points is less than the first preset threshold, supplementary tracking points are determined and added to the set of tracking points.

BRIEF DESCRIPTION OF THE DRAWINGS

The above and other features and advantages of the present disclosure will become more apparent from the detailed description of exemplary embodiments. It should be noted that the drawings in the following description are only some of the embodiments of the present disclosure, and other drawings may be obtained by those skilled in the art from these drawings without paying creative effort. In the drawings.

DETAILED DESCRIPTION

Figure 1:
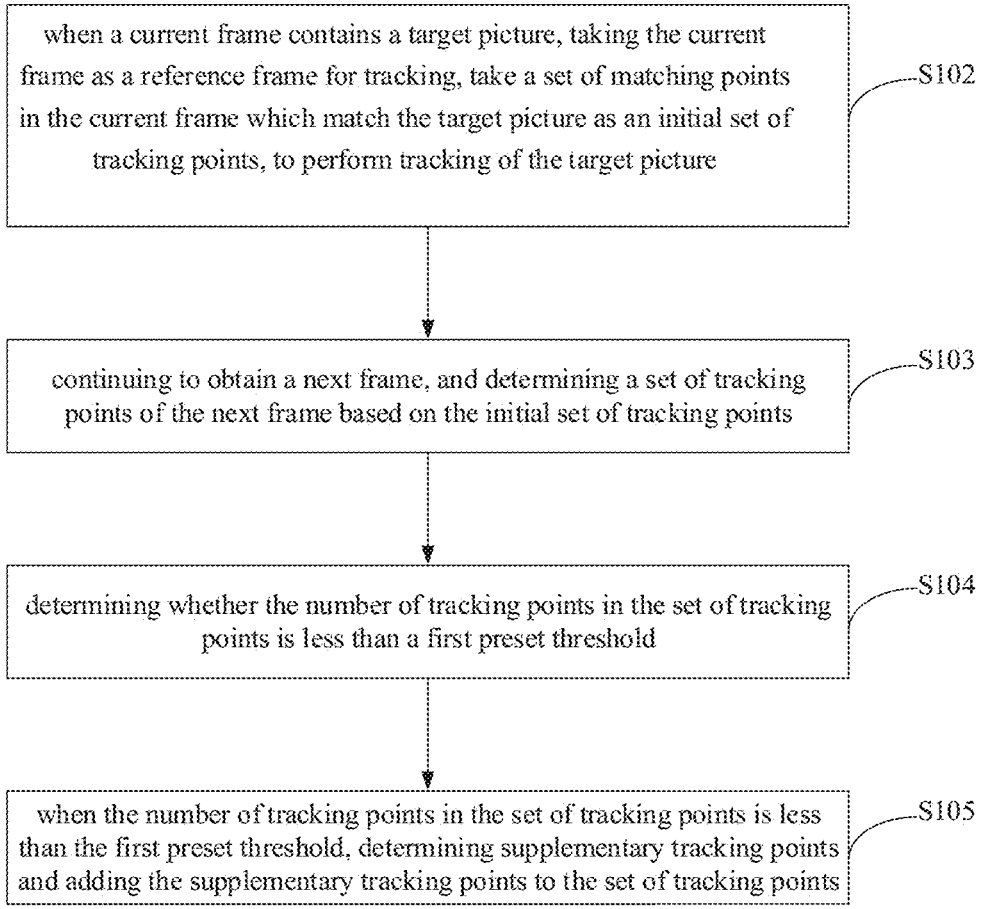
FIG. 1 illustrates a flow chart of an image processing method according to an exemplary embodiment of the present disclosure.

Exemplary embodiments will now be described more fully with reference to the accompanying drawings. However, the exemplary embodiments can be embodied in a variety of forms and should not be construed as being limited to the embodiments set forth herein. Rather, these embodiments are provided to make the present disclosure more complete and thorough, and to fully convey the concept of the exemplary embodiments to those skilled in the art. The described features, structures, or characteristics may be combined in any suitable manner in one or more embodiments. In the following description, numerous specific details are set forth to provide a thorough understanding of the embodiments of the present disclosure. However, one skilled in the art will appreciate that the technical solution of the present disclosure may be practiced without one or more of the specific details, or other methods, components, materials, devices, steps, etc. may be employed. In other instances, well-known technical solutions are not shown or described in detail to avoid obscuring aspects of the present disclosure.

In addition, the drawings are merely schematic illustrations of the present disclosure and are not necessarily drawn to scale. The same reference numerals in the drawings denote the same or similar parts, and the repeated description thereof will be omitted.

In an AR implementation, it is often required to track and recognize a picture. The function of the tracking is to obtain feature points of the current frame from tracking the previous frame (deleting feature points having a tracking error). In an embodiment of the present disclosure, a feature point may refer to an image or a target that can be represented in an identical or at least very similar, invariant form in other similar images containing the same scene or target. In other words, the same object or scene is captured in a plurality of images from different angles, if the same place can be recognized as the same, these points or blocks with 'scale invariance' are called feature points. For example, feature points may be points with rich local information, often appearing in places, such as corners of the image, where sharp change in texture occurs, etc., and may include, for example, a point or a corner point where the gray scale changes drastically, etc.

Common tracking methods include a pyramid optical flow tracking algorithm. The optical flow algorithm is a method to describe the motion of image pixels in a sequence of images over time. The pyramid-based Lucas-Kanade is a sparse optical flow algorithm, which is different from a dense optical flow algorithm, which calculates the motion of some pixels, with small calculation amount and better real-time performance.

The optical flow method considers that the image transforms $I(x, y, t)$ with time t, where $(x, y)$ is coordinates of an image pixel, and it is considered that the following assumptions are met:

(1) the gray level is unchanged: the gray-level value of the pixel of the same spatial point is unchanged in the image sequence;

(2) spatial consistency: a spatial point and its domain have similar motions in the sequence of images; and (3) time continuity: the image formed by the spatial point changes slowly in the image sequence.

According to the assumption (1), there are images for different moments.

$$I(x+dx, y+dy, t+dt) = I(x, y, t) \tag{1}$$

From Taylor expansion of the above equation, the following can be obtained:

$$I(x+dx, y+dy, t+dt) \approx I(x, y, t) + \frac{\partial I}{\partial x}dx + \frac{\partial I}{\partial y}dy + \frac{\partial I}{\partial t}dt. \tag{Equation 2}$$

The equation is simplified to obtain:

$$\frac{\partial I}{\partial x}\frac{dx}{dt} + \frac{\partial I}{\partial y}\frac{dy}{dt} = -\frac{\partial I}{\partial t}. \tag{Equation 3}$$

According to the assumption (2), it is considered that the pixels in a w×w small window where the pixel $(x, y)$ is located have the same motion, so that a number w×w of equations (3) can be obtained, using linear or nonlinear least squares method, a solve (dx/dt, dy/dt) can be obtained.

According to the assumption (3), an image pyramid implementation is constructed, and the position of the target pixel in the new frame is iteratively estimated from the top image to the bottom image, and the optical flow estimation from coarse to fine is realized.

The purpose of tracking an image feature point with a pyramid is to find a point $v(u_x+d_x, u_y+d_y)$ on the next frame of image J that matches (that is, has the closest gray-level value as) a previous point $u(u_x, u_y)$ on the previous frame of image I. Then, the vector $d=[d_x, d_y]$ is the speed of the image at point u, which is the optical flow of the pixel u.

The optical flow tracking algorithm inevitably causes the tracking point set to elapse during the tracking process. Therefore, after a period of time, both the tracking process and the calculation of the projection matrix process become unstable, and thus, re-recognition has to be performed. Re-recognition will result in frame skipping, and the recognition will occupy more computing resources, eventually resulting in a noticeable lag, that is, the virtual object suddenly disappears and suddenly appears after a while.

In response to the above problem, an embodiment of the present disclosure provides an image processing method. As shown in FIG. 1, the method includes the following steps.

At step S102, when the current frame contains the target picture, the current frame is taken as a reference frame for tracking, a set of matching points in the current frame which match the target picture is taken as an initial set of tracking points to perform tracking of the target picture.

At step S103, the process is continued to obtain a next frame, and a set of tracking points of the next frame is determined based on the initial set of tracking points.

At step S104, it is determined whether the number of tracking points in the set of tracking points is less than a first preset threshold.

At step S105, when the number of tracking points in the set of tracking points is less than the first preset threshold, supplementary tracking points are determined and added to the set of tracking points.

If the number of tracking points in the tracking point set is greater than or equal to the first preset threshold at step S104, it may be determined that the number of tracking points in the set of tracking points satisfies the tracking requirement, and the subsequent tracking processing may be continued.

In the method provided by the embodiment of the present disclosure, if a current frame contains a target picture, the frame may be regarded as a frame that first recognizes the target picture, the current frame may be taken as the reference frame for tracking, and a set of matching points of the current frame (that is, a set formed by the feature points matching the target picture in the current frame) is taken as the initial set of tracking points to track the target picture. When tracking the next frame after the current frame, it is determined whether the number of tracking points in the set of tracking points is less than a first preset threshold. If the number of tracking points in the set of tracking points is less than the first preset threshold, the set of tracking points is supplemented. Due to the long tracking process, failure in tracking the tracking points will continuously occur, resulting in unstable tracking. Through adoption of the method provided by the present disclosure, the stability of the AR tracking can be ensured by supplementing the set of tracking points to ensure the stability of the number of tracking points in the set of tracking points.

Figure 11:
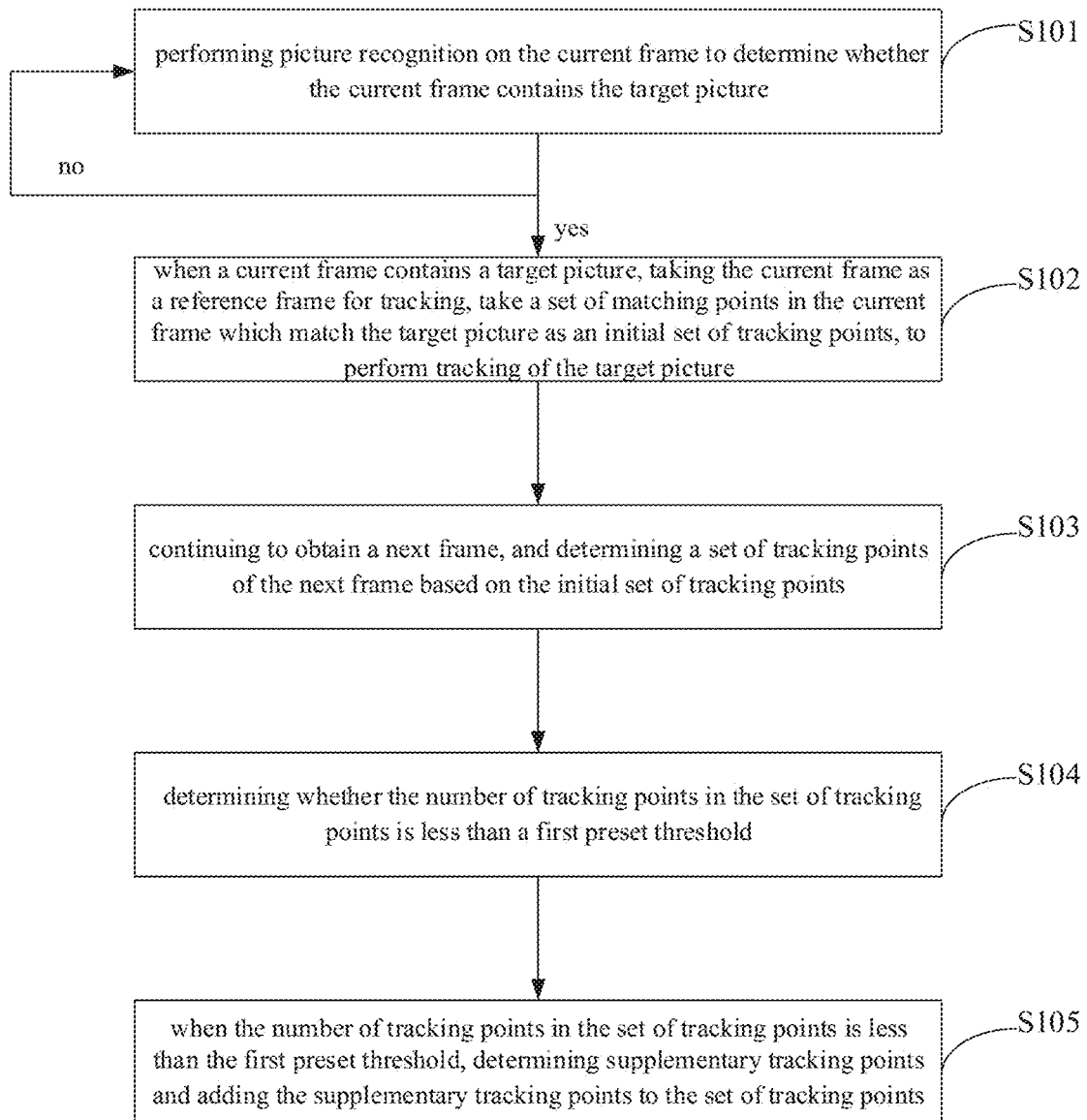
FIG. 11 illustrates a flow chart of an image processing method according to an exemplary embodiment of the present disclosure.

In an embodiment, before step S102, the method further includes step S101, in which picture recognition is performed on the image of the current frame to determine whether the current frame contains the target picture, as shown in FIG. 11.

In an embodiment, determining supplementary tracking points and adding them to the set of tracking points can include:
  extracting supplementary tracking points in the next frame;
  determining supplementary tracking points inside a polygon corresponding to the target picture; and
  adding the supplementary tracking points inside the polygon corresponding to the target picture to the set of tracking points.

Determining supplementary tracking points inside a polygon corresponding to the target picture includes:
  determining positions of a plurality of vertices of the target picture in the next frame;
  determining a polygon surrounded by the plurality of vertices; and
  determining supplementary tracking points inside the polygon.

Determining positions of a plurality of vertices of the target picture in the next frame includes: determining positions of four vertices of the target picture in the next frame.

Determining a polygon surrounded by the plurality of vertices, includes:
  taking the upper left corner of the next frame as the origin, the lateral direction of the next frame as the x-axis, and the longitudinal direction of the next frame as the y-axis, determining two vertices with the smallest ordinate values among the four vertices, determining a vertex with a smaller abscissa value among the two vertices having the smallest ordinate values as a first vertex, and a vertex with a larger abscissa value among the two vertices having the smallest ordinate values as a second vertex; determining two vertices with the largest ordinate values among the four vertices, determining a vertex with a smaller abscissa value among the two vertices having the largest ordinate values as a third vertex, and a vertex with a larger abscissa value among the two vertices having the largest ordinate values as a fourth vertex; and
  determining a quadrilateral surrounded by the first vertex, the second vertex, the third vertex, and the fourth vertex.

Determining supplementary tracking points inside the polygon includes:
  when the slope of the straight line formed by the first vertex and the third vertex is positive, determining that the lower side of the straight line formed by the first vertex and the third vertex is the inner side of the quadrilateral;
  when the slope of the straight line formed by the first vertex and the third vertex is negative, determining that the upper side of the straight line formed by the first vertex and the third vertex is the inner side of the quadrilateral;
  when the slope of the straight line formed by the second vertex and the fourth vertex is positive, determining that the upper side of the straight line formed by the second vertex and the fourth vertex is the inner side of the quadrilateral;
  when the slope of the straight line formed by the second vertex and the fourth vertex is negative, determining that the lower side of the straight line formed by the second vertex and the fourth vertex is the inner side of the quadrilateral; and
  determining supplementary tracking points at the inner side of the quadrilateral as supplementary tracking points inside the quadrilateral.

After the supplementary tracking points are added to the set of tracking points, the method further includes:
  calculating a posture transformation of the next frame and the target picture according to the set of tracking points; and
  filtering the final posture transformation results with Kalman filtering.

Continuing the process to obtain a next frame, and determining a set of tracking points of the next frame based on the initial set of tracking points includes:
  determining a set of tracking points of the next frame based on the initial set of tracking points with a pyramid optical flow algorithm.

After a set of tracking points of the next frame based on the initial set of tracking points is determined with the pyramid optical flow algorithm, the method further includes:
  performing back tracking with the pyramid optical flow algorithm to obtain a set of tracking points of the reference frame;
  determining a pixel distance between the set of matching points of the reference frame and the set of tracking points of the reference frame obtained by performing back tracking with the pyramid optical flow algorithm; and when a pixel distance between one or more tracking points in the set of tracking points of the reference frame obtained by performing back tracking with the pyramid optical flow algorithm and tracking points in the set of matching points of the reference frame is greater than a second preset threshold, deleting tracking points in the set of tracking points of the next frame which correspond to the one or more tracking points from the set of tracking points. When the pixel distance between one or more tracking points in the set of tracking points of the reference frame, obtained by performing back tracking with the pyramid optical flow algorithm and tracking points in the set of matching points of the reference frame, is smaller than or equal to the second preset threshold, it can be considered that one or more tracking points meet the tracking requirements and can remain in the set of tracking points.

After the tracking points in the set of tracking points of the next frame which correspond to the one or more tracking points are deleted from the set of tracking points, the method can further include:

determining a similarity between a tracking point in the set of tracking points of the next frame and a point in the set of matching points;

determining a tracking point having a similarity greater than a third preset threshold as a point of successful tracking, and keeping the point of successful tracking in the set of tracking points of the next frame; and determining a tracking point having a similarity less than or equal to the third preset threshold as a point of failed tracking, searching for an available tracking point in a local area where the point of failed tracking is located, and supplementing the available tracking point searched out into the set of tracking points of the next frame.

Searching for an available tracking point in a local area where the point of failed tracking is located includes:

searching for a point having a local matching score satisfies a fourth preset threshold in the local area where the point of failed tracking is located;

when a point having a local matching score satisfies the fourth preset threshold is searched out, determining the point having a local matching score satisfies the fourth preset threshold as an available tracking point;

when a point having a local matching score satisfies the fourth preset threshold is not searched out, determining whether the point of failed tracking is a corner point; and when the point of failed tracking is a corner point, supplementing the point of failed tracking into the set of tracking points of the next frame.

The implementation of the disclosed embodiment will be described below by way of specific examples.

Figure 2:
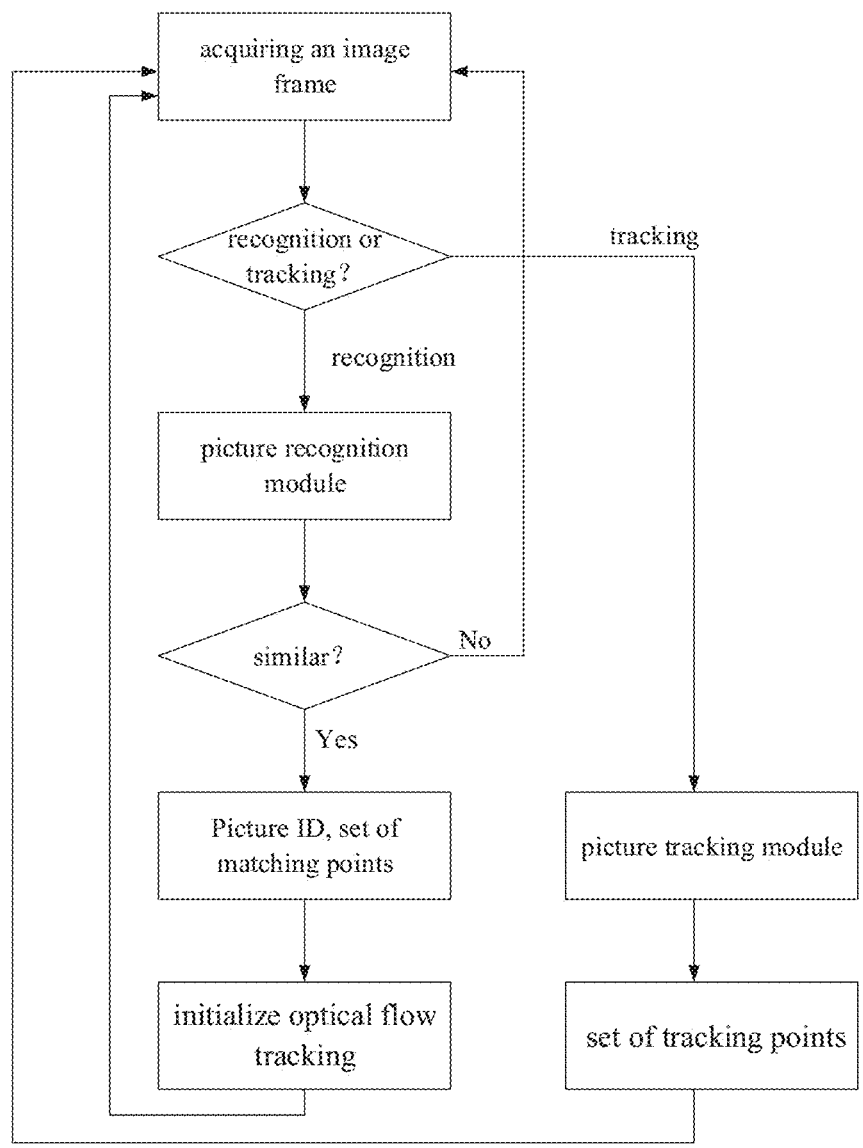
FIG. 2 illustrates a recognition and tracking process according to an exemplary embodiment of the present disclosure.
Figure 3:
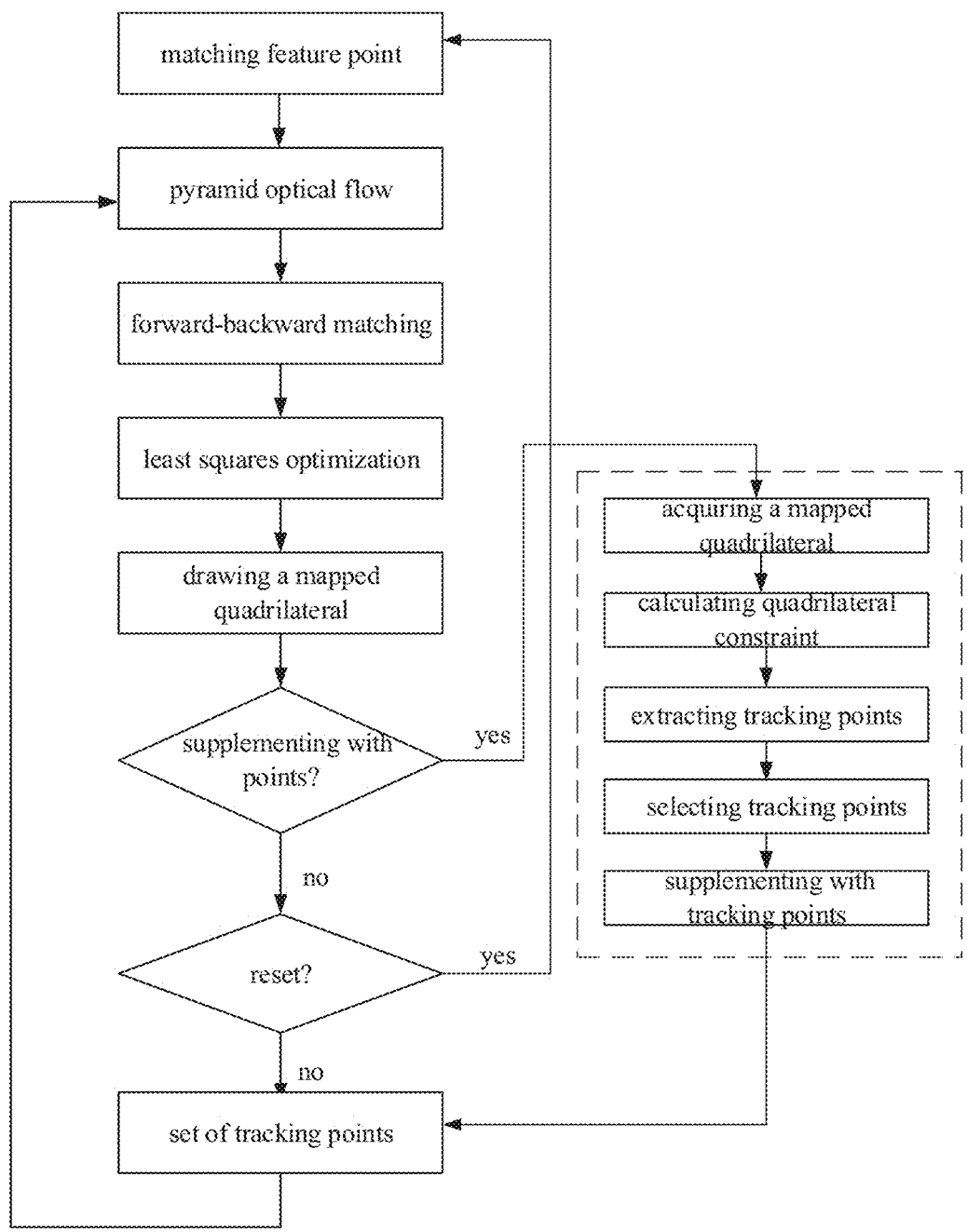
FIG. 3 illustrates a tracking process according to an exemplary embodiment of the present disclosure.

FIG. 2 illustrates a recognition and tracking process according to an exemplary embodiment of the present disclosure. FIG. 3 illustrates a tracking process according to an exemplary embodiment of the present disclosure.

In FIG. 2, a current image frame is first acquired and then, it is determined whether the image frame needs to be recognized or tracked. If it is determined that the current frame needs to be recognized, a picture recognition module is entered to perform image recognition to determine whether a target picture can be recognized in the current frame (i.e., determining whether the current frame is similar to the target picture), and to output an ID of the target picture that matches the current frame and a set of matching points. The optical flow tracking can be initialized based on the output ID of the picture and the set of matching points. For optical flow tracking, the initial set of tracking points is empty and the set of tracking points needs to be initialized. In an embodiment of the present disclosure, a set of matching points in the picture recognition result is taken as the initial set of tracking points.

In the tracking process of FIG. 3, first, the recognition result of the picture recognition module is acquired (as shown in FIG. 2). That is, the picture recognition is first performed to determine whether the current frame contains the target picture. The frame in which the target picture is first recognized is called a reference frame, and a set of matching points of the reference frame can be obtained. The reference frame can be taken as an initial frame of the tracking, and the set of matching points of the reference frame can be set as the initial set of tracking points. That is, it is set to a 3D point with a z coordinate of 0 (i.e., a point containing three coordinates of x, y, and z, but the value of the z coordinate is 0).

The process continues to obtain a real-time frame, i.e. the next frame image. The set of matching points of the previous frame (i.e., the reference frame) is tracked with the pyramid optical flow algorithm to obtain the set of tracking points of the next frame, and the points of failed tracking are deleted.

The set of tracking points is filtered with a forward-backward matching method to filter out points with large errors. The forward-backward matching method refers to tracking from a previous frame to obtain a current frame as forwarding tracking, and refers to tracking from the current frame back to the previous frame as backward tracking or back tracking. Considering the point as a stable corner point feature, the forward and backward matching should be the exact opposite processes, therefore, a distance error of the forward and backward matching of the same point in the previous frame can be calculated as:

$$\Delta d = \|I'(x, y) - I(x, y)\|^2 \tag{4}$$

When the distance error is greater than the second preset threshold, the tracking of the current point is considered unstable, and the point is deleted.

According to an exemplary embodiment, the degree of similarity between the tracking point and the matching point can be further confirmed with a local matching method. If the similarity is greater than the third preset threshold, it is considered to be a point of successful tracking; otherwise, it is determined as a point of failed tracking. The specific matching can be, for example, a Normalized Cross Correlation (NCC) or a Sum of Squared Differences (SSD).

For the point of failed tracking, in the local area where the point of failed tracking is located (such as within a window of w*w), a point having a NCC or SSD score satisfying the fourth preset threshold is searched for. If the point exists, the point is considered as an available tracking point. If no such point exists, it is determined whether the current point of failed tracking is a corner point. If it is a corner point, the point is taken as a supplementary point to participate in the tracking of the next frame, and, if it is not a corner point, the point of failed tracking is deleted from the set of tracking points.

After that, a posture calculation process is performed. Specifically, the posture transformation of the current frame and the target picture can be calculated according to the set of matching points or the set of tracking points and optimized calculation is performed. When calculating the posture transformation of the camera, an n-point Perspective-n-Point (PnP) algorithm can be utilized.

Specifically, the 3D-2D matching can be constructed according to the set of matching points of the current frame or the set of tracking points, an initial posture matrix T is estimated with the PnP algorithm, and then, a re-projection error optimization function of the posture transformation T(R|t) based on the least squares is constructed according to the initial posture matrix, as:

$$\xi^* = \operatorname{argmin} \frac{1}{2} \sum_{i=1}^{n} \left\| u_i - \frac{1}{s_i} K \exp(\xi^\wedge) P_i \right\|_2^2 \circ, \quad (12)$$

where $\xi$ is the Lie algebraic form of the transformation matrix T, $u_i$ is the coordinates of the pixel of the matching point of the recognized picture obtained by optical flow matching, K is an internal reference matrix of the camera, $\xi^\wedge$ represents the antisymmetric matrix of the Lie algebra, $P_i$ is 3D coordinates of the matching point of the target picture, $$\frac{1}{s_i} K \exp(\xi^\wedge) P_i$$

represents the process in which the 3D matching point of the target picture is projected onto the picture of the current frame according to the initial transformation matrix, and $s_i$ is the depth value of the 3D point $\exp(\xi^\wedge)P_i$.

Through the posture transformation of the camera, an optimized posture transformation can be obtained. Based on the optimized posture, the transformation between coordinates of the camera and world coordinates can be realized and the AR effect can be realized through virtual reality.

After, it is determined whether the number of sets of tracking points is less than the first preset threshold, that is, whether a supplementary point is needed. If so, feature points are extracted in the picture of the current frame (for example, feature points can be corner points), the feature points are filtered based on a constraint calculated according to the posture transformation T and taken as supplementary of the set of tracking points.

If it is not necessary to supplement the set of tracking points, it is determined whether a reset is needed, that is, whether it is necessary to re-initialize the set of tracking points of the optical flow tracking algorithm. If a reset is necessary, the set of tracking points is re-initialized and, if not, it is determined whether the number of the sets of tracking points of the supplemented set of tracking points is greater than or equal to the first preset threshold. If so, the set of tracking points, the image of the current frame and the transformation matrix are taken as tracking results, and the process returns to the above steps to continue obtaining a real-time frame, and, if not, the tracking is considered unstable, and the process returns to the recognition module to continue the picture recognition.

The supplementary process of the set of tracking points in the embodiment of the present disclosure is as follows.

Figure 4:
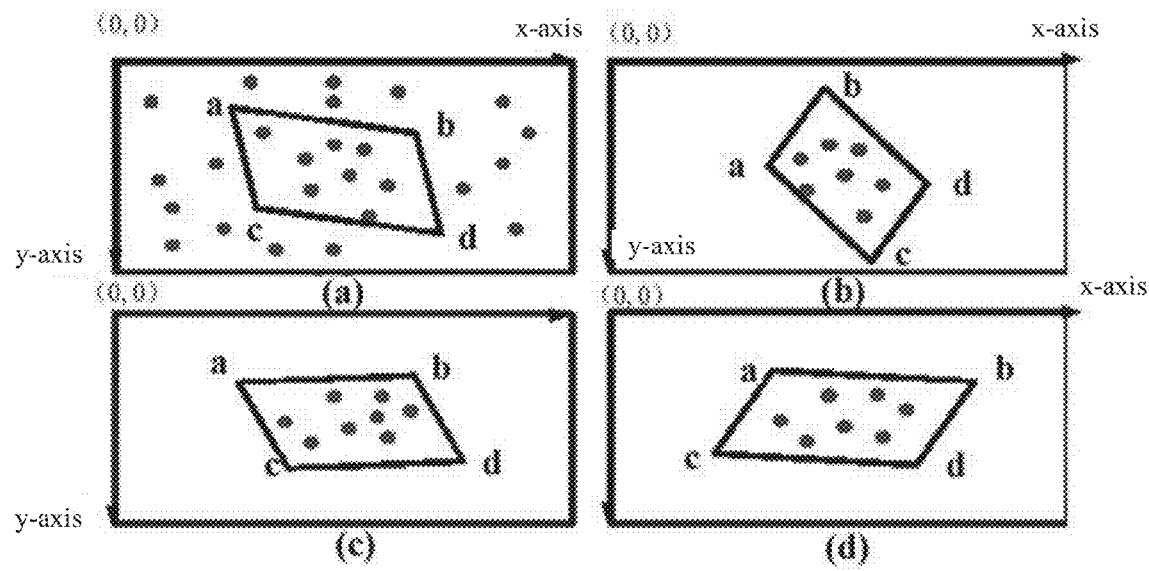
FIG. 4 illustrates a schematic diagram of a position of a target picture in the current frame.

When the number of the sets of tracking points is less than the first preset threshold, the set of tracking points is extracted in the full picture, as shown in (a) of FIG. 4.

The positions of the vertices of the original target picture in the image frame are calculated according to the posture transformation matrix, as shown in FIG. 4. The target picture refers to a training picture in a pre-established training picture library, and the original size of the target picture is known. For example, if the initial size of the target picture is 468*668 and the picture has a rectangular shape, the coordinates of the four vertices of the target picture are known in the coordinate system having an origin as the upper left corner of the image frame. For the current frame, the projection of the four vertices of the target picture in the image frame can be obtained as the positions of the four vertices of the target picture in the image frame. The vertices of the target picture can include multiples, for example, the four vertices of the target picture.

Reference numerals of the four vertices are determined. The numbering rule can be as follows: the point in the upper left corner of FIG. 4 is taken as the origin, two points having the smallest y-values of the four points (the y-value is the ordinate) are taken as points a and b, with the point having the smaller x-value of the points a and b being point a (i.e. the first vertex) and the point having the larger x-value being point b (i.e. the second vertex); and two points having the largest y-values of the four points are taken as points c and d, with the point having the smaller x-value being point c (i.e. the third vertex) and the point having the larger x-value being point d (i.e. the fourth vertex). Regardless of how the view angle changes, the order of the determined four vertices is always abdc, as shown in (b), (c) and (d) of FIG. 4.

Next, the polygon surrounded by the four vertices (the quadrilateral in the case of four vertices) is determined, and the points inside the polygon are determined as supplementary tracking points. For example, the straight line equations of four straight lines ab, bd, dc, and ca can be calculated separately.

According to the constraint constructed by the linear equations, the tracking points inside the quadrilateral are selected from the set of points of the entire picture. The constraint can be, for example, determining the inner side of the quadrilateral according to the linear equations of ab, bd, dc, and ca, and selecting points located at the inner side the quadrilateral as the set of supplementary points. It should be noted that the lower side the line ab and the upper side of the line cd are always the inner side of the quadrilateral. When the slope of the line ac is positive, the lower side of the line is the inner side of the quadrilateral. When the slope is negative, the upper side is the inner side of the quadrilateral. The situation for the straight line bd is opposite to the situation for the straight line ac. When the slope is positive, the upper side is the inner side of the quadrilateral, and when the slope is negative, the lower side is the inner side of the quadrilateral.

The set of supplementary points in the quadrilateral is merged into the set of tracking points to complete the process of supplementing points.

In an embodiment of the present disclosure, the process of recognizing (i.e., the step of performing picture recognition on the current frame to determine whether the current frame contains the target picture) can employ a picture recognition method.

According to other embodiments, the process of performing picture recognition can also adopt a method based on the Bag of Word (BoW) method.

Image retrieval technology is widely used in pattern recognition, SLAM (simultaneous localization and mapping), and artificial intelligence.

The basic concept of image retrieval technology (i.e., image recognition) is that, given an image to be retrieved, a picture or a collection of pictures similar to the image to be retrieved is retrieved from a particular image library. In the current image retrieval technology, for example, in the image retrieval technology based on the bag of word model, in order to increase the distinguishability of the image vectors when the size of the image library becomes large, a very large size of visual words is usually required, and in the image retrieval stage, it is required to load a visual dictionary consisting of these visual words in advance, which will greatly increase occupation of the memory and make it difficult to meet the requirements of deploying on the mobile side (e.g., on mobile computing devices).

Figure 5:
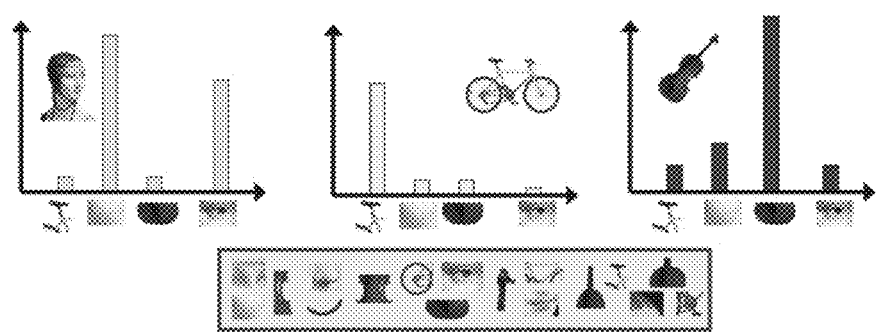
FIG. 5 shows a schematic diagram of a picture histogram according to a technical solution.

The bag of word model is a commonly used algorithm in the field of image retrieval. The algorithm first extracts the local features of the training picture and constructs the feature descriptors of the local features. Then, the clustering algorithm is used to train and cluster the feature descriptors to generate a visual dictionary. Then, the visual features are quantized by KNN (K-Nearest Neighbor) algorithm, and finally the picture histogram vector weighted by TF-IDF (term frequency-inverse document frequency) is obtained. The same method is used to obtain the image histogram vector of the image to be retrieved, and the distance calculation method is used to determine whether the training picture is similar to the image to be retrieved. The more similar the picture, the closer the histogram vector distance. A list of similar pictures is output based on the calculated distances between the histogram vectors FIG. 5 shows a schematic diagram of a picture histogram according to one technical solution. Referring to FIG. 5, for three pictures of respectively a face, a bicycle and a guitar, similar features are extracted (or similar features are merged into the same class), and a visual dictionary is constructed, which contains four visual words, namely a visual dictionary={1. "Bicycle", 2. "Face", 3. "Guitar", 4. "Face Class"}. Therefore, the face, the bicycle, and the guitar can all be represented in a 4-dimensional vector. Finally, according to the number of occurrences of the corresponding features of the three pictures, the corresponding histograms are drawn. In FIG. 5, for the three pictures, a picture histogram is generated based on the four visual words, and similar pictures will have similar histogram vectors.

However, in the bag of word model technical solution, in order to achieve better retrieval results, it is usually necessary to train a large-scale visual dictionary, and a visual dictionary with better effect can reach tens or even hundreds of megabytes of storage scale, which will greatly increase occupation of the memory and make it difficult to meet the requirements of deploying on the mobile side.

Figure 6:
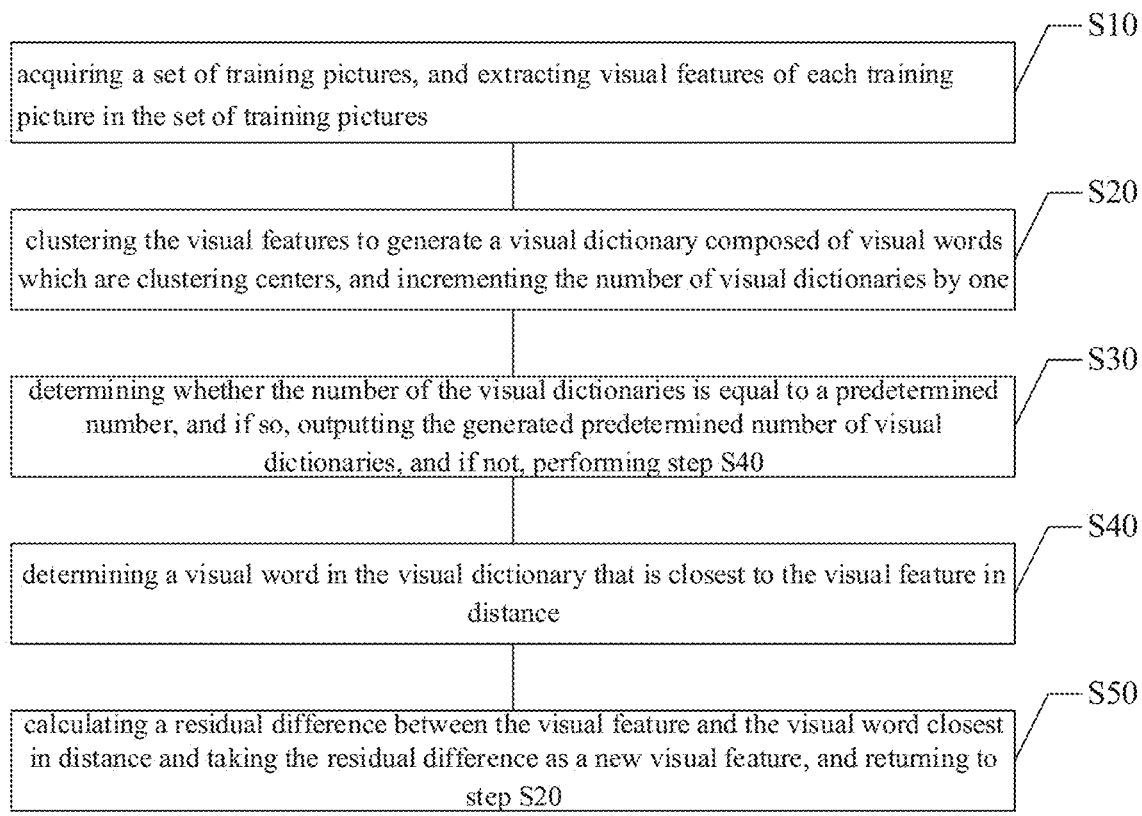
FIG. 6 illustrates a flow chart of an image processing method according to an exemplary embodiment of the present disclosure.

Based on the above, in an exemplary embodiment of the present disclosure, the image processing method can include the following steps (see FIG. 6).

At step S10, a set of training pictures is acquired, and visual features of each training picture in the set of training pictures are extracted.

At step S20, the visual features are clustered to generate a visual dictionary composed of visual words which are clustering centers, and the number of visual dictionaries is incremented by one.

At step S30, it is determined whether the number of the visual dictionaries is equal to a predetermined number and, if so, the generated predetermined number of visual dictionaries are outputted and, if not, step S40 is performed.

At step S40, a visual word in the visual dictionary that is closest to the visual feature in distance is determined.

At step S50, a residual difference between the visual feature and the visual word closest in distance is calculated and taken as a new visual feature, and the process returns to step S20.

According to the image processing method in the exemplary embodiment of FIG. 6, on one hand, the visual feature or the residual difference between the visual feature and the visual word are clustered, a visual dictionary composed of visual words which are clustering center is generated, and it is possible to generate a predetermined number of parallel visual dictionaries of the same scale. On the other hand, since any visual feature can be indexed simultaneously in the predetermined number of parallel visual dictionaries, the size of visual words in the visual dictionary can be significantly reduced, thereby significantly reducing the storage size of the visual dictionaries and facilitating deployment at the mobile side.

Hereinafter, the image processing method in the exemplary embodiment of FIG. 6 will be described in detail.

At step S10, a set of training pictures is acquired, and visual features of each training picture in the set of training pictures are extracted.

In an exemplary embodiment, a plurality of pictures are acquired from a picture database of the server as a set of training pictures. The pictures in the picture database can include landscape pictures, person pictures (e.g., pictures of people), product pictures, architectural pictures, animal pictures, and plant pictures, etc., which are not specifically limited in the present disclosure.

Further, the corresponding visual features of the training pictures can be extracted based on the SIFT (Scale-Invariant Feature) algorithm, the SURF (Speeded Up Robust Features) algorithm, or the ORB (Oriented FAST and Rotated BRIEF) operation. However, the method for extracting visual features from the training pictures of the present disclosure is not limited thereto. For example, it is also possible to extract a texture picture feature a direction gradient histogram feature, a color histogram feature, and the like from the training pictures.

At step S20, the visual features are clustered to generate a visual dictionary composed of visual words which are clustering centers, and the number of visual dictionaries is incremented by one.

In an exemplary embodiment, the visual features of each training picture can be clustered by clustering operations. The clustering operation can include K-means clustering and K-center point clustering, but embodiments of the present disclosure are not limited thereto. For example, the clustering operation can also be a hierarchical clustering operation and a density-based clustering operation, which is also in the scope of protection of the present disclosure.

Further, the clustering center of each cluster obtained by clustering the visual features of each training picture is taken as a visual word, and the visual dictionary is composed of visual words. For example, when the clustering center K is equal to 8, there are 8 visual words, and the 8 visual words constitute a visual dictionary. In the initial case, the number of visual dictionaries can be set to 0, and the number of visual dictionaries is incremented by one each time a visual dictionary is generated.

At step S30, it is determined whether the number of the visual dictionaries is equal to a predetermined number, and if so, the generated predetermined number of visual dictionaries are outputted, and if not, step S40 is performed.

In an exemplary embodiment, the predetermined number of the visual dictionaries is M, and each time a visual dictionary is generated, it can be determined whether the number of visual dictionaries is equal to M. When the number of visual dictionaries is equal to M, the generated M visual dictionaries are outputted. When it is determined that the number of visual dictionaries is not equal to M, the next step S40 is performed. Visual words of the same size are stored in each visual dictionary.

It should be noted that the predetermined number M of the visual dictionaries can be determined according to factors such as the size of the set of training pictures, the memory size, and the like. For example, when the size of the set of training pictures is small and the memory is large, the predetermined number M can be set to 3.

At step S40, a visual word in the visual dictionary that is closest to the visual feature in distance is determined.

In an example embodiment, the distance between the vector of visual features and the vectors of the visual words in the visual dictionary can be calculated to obtain a visual word that is closest to the visual feature in distance. The distance between the visual feature and the visual word can be a Hamming distance, an Euclidean distance, or a Cosine distance, but the distance in the exemplary embodiment of the present disclosure is not limited thereto, for example, the distance can also be a Mahalanobis distance, a Manhattan distance, or the like.

Next, in S50, a residual difference between the visual feature and the visual word closest in distance is calculated and taken as a new visual feature, and the process returns to step S20.

In an exemplary embodiment, the difference between the visual feature and the visual word closest to the visual feature in distance can be calculated, and the calculated difference between the visual feature and the visual word closest to the visual feature in distance can be taken as a new visual feature, and the process returns to step S20.

At step S20, new visual features composed of the differences between the visual features and the visual words closest to the visual features in distance are clustered to generate a visual dictionary composed of visual words which are the clustering centers, and the loop is executed until the predetermined number of visual dictionaries are acquired at step S30.

Figure 7:
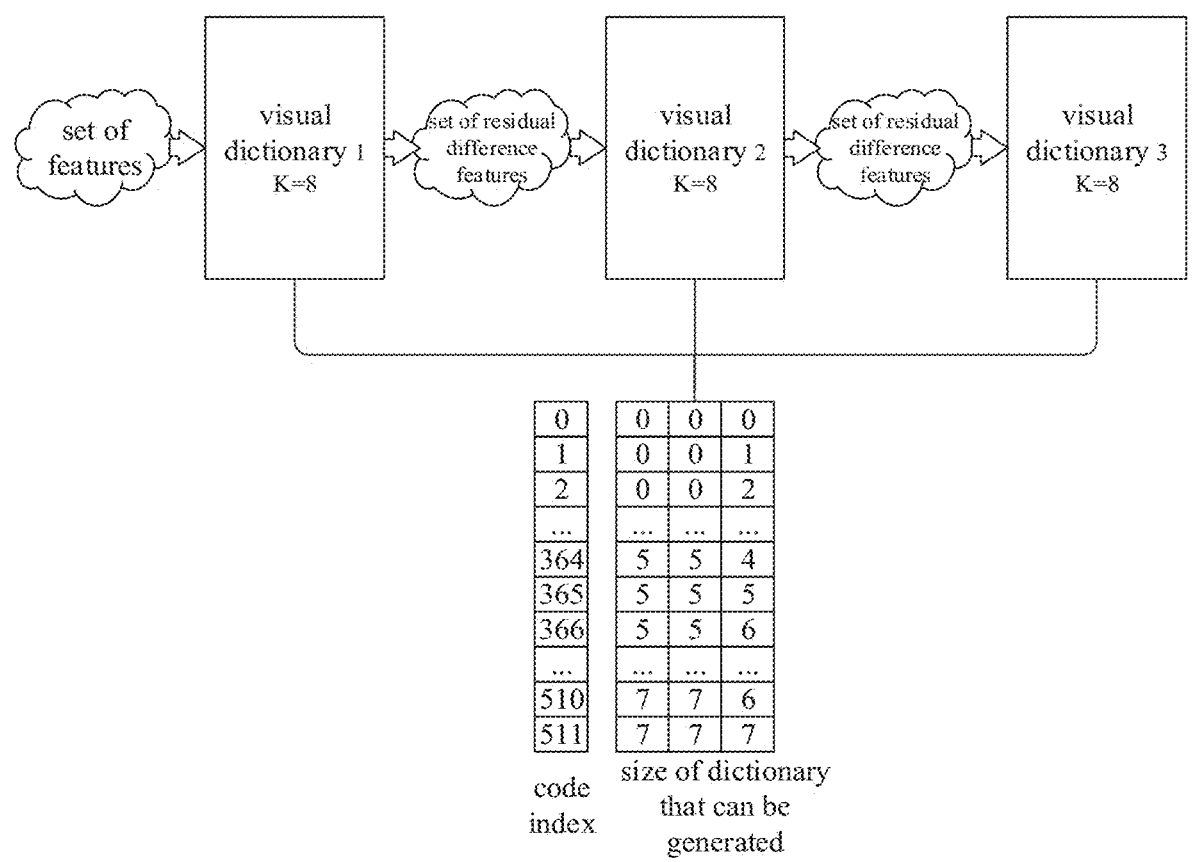
FIG. 7 illustrates a schematic diagram of indexing a visual feature from three visual dictionaries, according to some embodiments of the present disclosure.

FIG. 7 illustrates a schematic diagram of indexing a visual feature from three visual dictionaries, according to some embodiments of the present disclosure.

Referring to FIG. 7, a number K=8 of visual words are stored in the visual dictionary 1, the visual dictionary 2, and the visual dictionary 3, respectively. The visual dictionary 1 is a visual dictionary obtained by a set of clustering visual features, and the visual dictionary 2 and the visual dictionary 3 each is a visual dictionary obtained by clustering a set of residual difference features composed of residual differences between the visual features and the visual words closest to the visual features in distance from the previous visual dictionary.

When a visual feature is indexed, the indices of the visual feature are sequentially acquired from the visual dictionary 1, the visual dictionary 2, and the visual dictionary 3, respectively. For example, an index of a visual word that is closest to the visual feature is obtained in the visual dictionary 1 is 5; a residual difference between the visual feature and the visual word closest in distance in the visual dictionary 1 is calculated, an index of a visual word that is closest to the residual difference is obtained in the visual dictionary 2 is 5; the residual difference is taken as a new visual feature, a residual difference between the new visual feature and the visual word closest in distance in the visual dictionary 2 is calculated; and an index of a visual word that is closest to the residual difference is obtained in the visual dictionary 3 is 4. Thus, the final index of the visual feature obtained from the visual dictionaries 1 to 3 can be 554, which is equivalent to an index of the 365th visual word in one visual dictionary, that is, equivalent to obtaining the final index of the visual feature from the Cartesian product of the visual dictionaries.

Since any visual feature can be indexed using M=3 visual words, the scope of the index values of the three visual dictionaries is $K^M=8^3=512$, but the number of visual words that need to be stored in the three visual dictionaries is only $K*M=24$. Compared to the case of using only one visual dictionary, it can greatly reduce the storage size of the visual dictionary, and facilitate the deployment on the mobile side.

Figure 8:
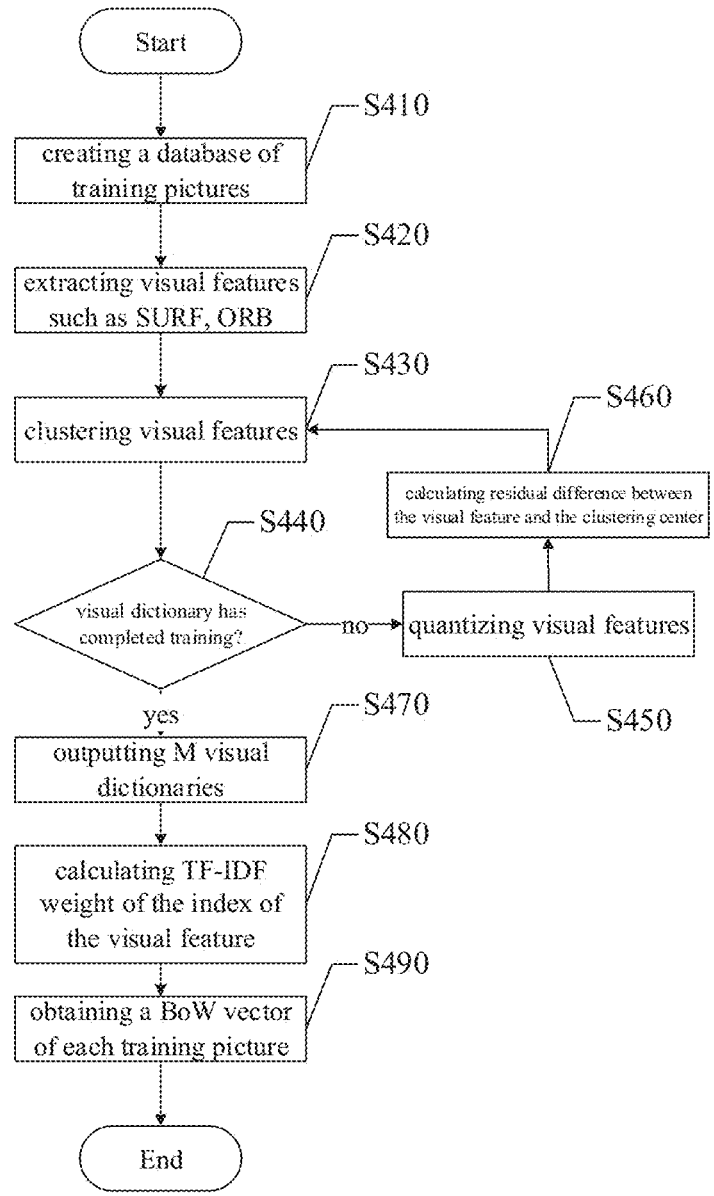
FIG. 8 illustrates a flow chart of an image processing method according to an exemplary embodiment of the present disclosure.

FIG. 8 shows a flow chart of an image processing method according to an exemplary embodiment of the present disclosure.

Referring to FIG. 8, at step S410, a plurality of pictures are acquired as a set of training pictures, and a database of training pictures is created. For example, it is possible to acquire a plurality of pictures from the image database on the server as a set of training pictures, and establish a database of training pictures.

At step S420, visual features of each training picture in the set of training pictures are extracted, for example, such as scale invariant features, accelerated robust features, color histogram features, or texture map features.

At step S430, the extracted visual features of the training pictures are clustered by clustering operation, and the clustering centers of the clusters obtained by clustering are taken as visual words, and a visual dictionary is composed of the visual words. The clustering operation can include K-means clustering and K-center point clustering, but embodiments of the present disclosure are not limited thereto. For example, the clustering operation can also be a hierarchical clustering operation and a density-based clustering operation, which is also in the scope of protection of the present disclosure.

At step S440, it is determined whether the number of visual dictionaries has reached the predetermined number M. If so, the process proceeds to step S470 and, if not, step S450 is performed. The predetermined number M of the visual dictionaries can be determined according to factors such as the size of the set of training pictures, the size of the memory, and the like. For example, when the size of the set of training pictures is small and the memory is large, the predetermined number M can be set to 3.

At step S450, the visual features extracted at step S420 are quantized, that is, the distance between the visual feature and each visual word in the visual dictionary is calculated, and the visual word closest to the visual feature in distance is determined. The distance between the visual feature and the visual word can be a Hamming distance, an Euclidean distance, or a Cosine distance, but the distance in the exemplary embodiment of the present disclosure is not limited thereto. For example, the distance can also be a Mahalanobis distance, a Manhattan distance, or the like.

At step S460, a residual difference between the visual feature and the visual word closest to the visual feature in distance is calculated, and the obtained residual difference between each visual feature and the visual word closest to the visual feature in distance is taken as a new visual feature and input to step S430. At step S430, a set of residual differences composed of residual differences between the visual features and the visual words are clustered, and a new visual dictionary composed of visual words which are the clustering centers is generated. The loop is executed until a predetermined number of visual dictionaries are acquired at step S440.

At step S470, the M visual dictionaries completed training at step S440 are outputted. The same number of visual words are stored in each visual dictionary.

At step S480, based on the M visual dictionaries outputted at step S470, an index of each visual feature of the training picture is determined, a TF-IDF (term frequency-inverse document frequency) weight of the index of each visual feature of the training picture is counted, which is equivalent to the TF-IDF weight of the index of the visual feature determined from the Cartesian product of the M visual dictionaries. Specifically, M visual words closest to the visual feature of the training picture in distance can be determined from the M visual dictionaries, the final index of the visual feature is determined based on the indices of the M visual words, and the word frequency-inverse document frequency weight of the final index of each visual feature of the training picture is counted.

The word frequency of the visual feature reflects the number of times the visual feature appears in the picture, and the inverse document frequency of the visual feature reflects the distinguishing ability of the visual feature to the picture. The greater the inverse document frequency, the stronger the distinguishing ability of the visual feature to the picture. The word frequency-inverse document frequency weight of the visual feature is obtained by multiplying the word frequency of the visual feature by the inverse document frequency of the visual feature.

At step S490, a BoW (Bag of words) vector of each training picture is obtained based on the TF-IDF weights of the indices of the visual features of the training picture. The TF-IDF weights of the indices of the visual features of the training picture constitute the bag of word vector of the training picture.

Figure 9:
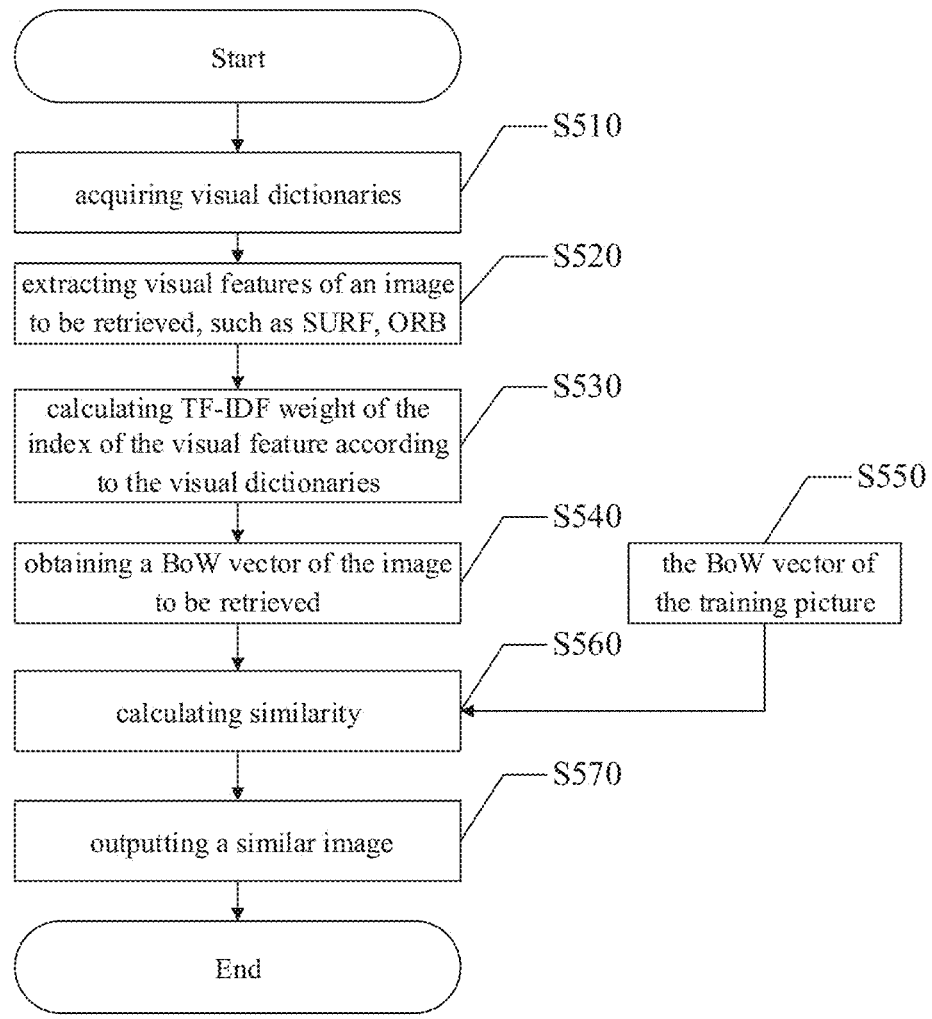
FIG. 9 illustrates a flow chart of an image processing method according to an exemplary embodiment of the present disclosure.

FIG. 9 is a flow chart showing an image processing method according to an exemplary embodiment of the present disclosure.

Referring to FIG. 9, at step S510, the M visual dictionaries outputted in the above-described exemplary embodiment of FIG. 5 is acquired.

At step S520, a visual feature of the image to be retrieved is extracted, such as a scale-invariant feature, an accelerated robust feature, a color histogram feature, or a texture map feature. For the embodiment of the present disclosure, each frame can be regarded as an image to be retrieved when picture recognition is performed for each frame.

At step S530, the TF-IDF weight of the index of the visual feature of the image to be retrieved is calculated according to the acquired M visual dictionaries, that is, the TF-IDF weight of the visual feature is determined from the Cartesian product of the M visual dictionaries. For example, M visual words closest to the visual feature of the image to be retrieved in distance can be sequentially determined from the M visual dictionaries, the final index of the visual feature is determined based on the indices of the M visual words, and the TF-IDF weight of the final index of each visual feature of the image to be retrieved is counted.

At step S540, a BoW vector of the image to be retrieved is obtained based on the TF-IDF weight of the index of each visual feature of the image to be retrieved.

At step S550, the BoW vector of the training picture generated in the above-described exemplary embodiment is acquired.

At step S560, the distance between the BoW vector of the image to be retrieved and the BoW vector of each training picture is calculated, and the similarity between the image to be retrieved and each training picture is determined based on the calculated distance. The distance between the BoW vectors can be a Hamming distance, an Euclidean distance, or a Cosine distance, but the distance in the exemplary embodiment of the present disclosure is not limited thereto. For example, the distance can also be a Mahalanobis distance, a Manhattan distance, or the like.

At step S570, the training picture having similarity with the image to be retrieved greater than a predetermined threshold is outputted, that is, the image retrieval process is completed.

Further, a comparison of the algorithm complexity among the method of the exemplary embodiment of the present disclosure, the original bag of word model, and the visual dictionary of the tree structure is shown in Table 1 below. In the algorithm complexity analysis, BoW refers to the original bag of word model, and VT (Vocabulary Tree) refers to the visual dictionary of the tree structure.

TABLE 1

|  | BoW | VT | embodiment of the present disclosure |
| --- | --- | --- | --- |
| Space complexity | $O(K^M D)$ | $O(K^M D)$ | $O(MKD)$ |
| Time complexity | $O(K^M D)$ | $O(MKD)$ | $O(MKD)$ |

Referring to Table 1, the space complexity of the original bag of word model is the M-th order of K, and the time complexity is the M-th order of K. The space complexity of the visual dictionary of the tree structure is M-th order of K, and the time complexity is a linear order of K. The space complexity of the exemplary embodiment of the present disclosure is the linear order of K, and the time complexity is the linear order of K. Therefore, the exemplary embodiment of the present disclosure can significantly reduce the space complexity and time complexity, and improve image processing efficiency.

Figure 10:
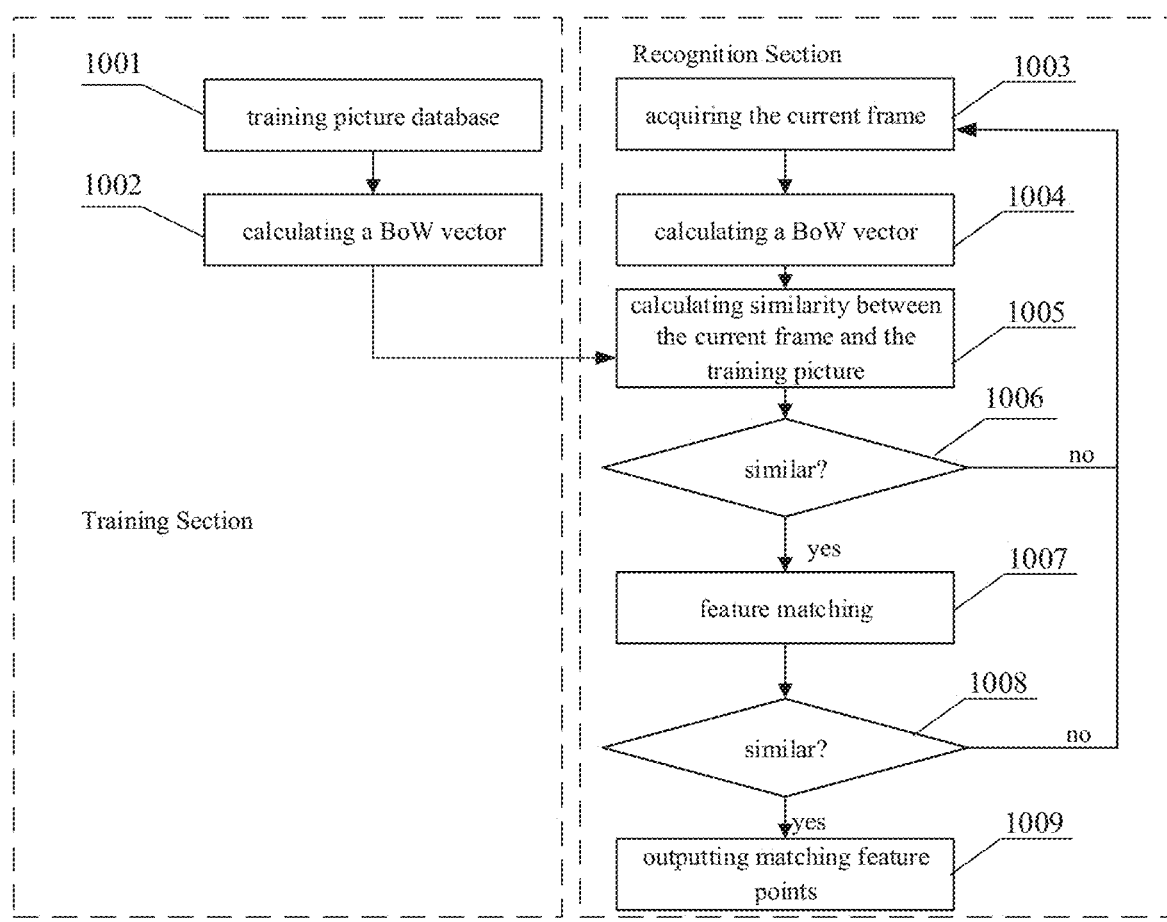
FIG. 10 illustrates an overall block diagram of a training part and a recognition process according to an embodiment of the present disclosure.

FIG. 10 illustrates an overall block diagram of a training part and a recognition process according to an embodiment of the present disclosure.

First, for the training part, at step 1001, a training picture database is established, and each training picture in the picture database can have a corresponding ID.

At step 1002, a BoW vector of the training picture is calculated and here, the training picture is the target picture of the embodiment of the present disclosure.

The main steps 1001 and 1002 of the training section are outlined in FIG. 10. For a detailed description of the training section, reference can be made to the detailed description of the picture training above.

For the recognition section, at step 1003, a current image frame is acquired.

At step 1004, a BoW vector of the current frame is obtained based on a method similar to that for obtaining a BoW vector of the training picture.

At step 1005, a similarity between the current frame and the training picture is determined. If the current frame is similar to one or more training pictures (e.g., the similarity is greater than a certain predetermined threshold), then feature matching is performed at step 1007. If there is no training picture similar to the current frame, it is considered that the target picture is not recognized in the current frame, and step 1003 is continued to perform picture recognition on the subsequent image frame.

The forward index can be used to speed up the matching in the process of feature matching at step 1007. It is determined whether the final set of matching points after the feature matching is greater than a certain preset threshold (step 1008). If it is greater than the preset threshold, it is considered that the target (i.e., the training picture similar to the current frame) is recognized, and the set of matching feature points is outputted (step 1009). Otherwise, the process proceeds to step 1003 to perform picture recognition on subsequent image frames.

In the method provided by the embodiment of the present disclosure, the supplementary point strategy is used to supplement the set of tracking points, and the new set of tracking points is selected by calculating the quadrilateral constraint to ensure the stability of the long-term tracking. In other embodiments, a point outside the quadrilateral (or other polygon) (i.e., a point outside the area surrounded by the quadrilateral) can also be taken as the tracking point, especially if the target picture remains stationary or still relative to the background, a point outside the polygon can be used to supplement the set of tracking points. This is because the point outside the polygon will not affect the tracking stability if the target picture remains stationary or still relative to the background.

In addition, in the process of selecting the tracking points of a certain frame, the forward and backward matching method can be used to filter out the points with large errors.

In addition, it is also possible to count the number of tracking times of the feature point to delete points with a large number of tracking times. Specifically, for a point of successful tracking in the set of tracking points of the next frame, which is determined by the pyramid optical flow algorithm based on the initial set of tracking points, the number of successful tracking times of the point of successful tracking is determined, and the point of successful tracking having a number of successful tracking times exceeding a fifth threshold is deleted from the set of tracking points. This is because the inventor has found in the implementation of the present disclosure, that in the tracking process, due to the drift, the longer the tracking time, the more serious the drift will be. By deleting the point with more tracking success times, the drift of the tracking points in the set of tracking points can be reduced.

In addition, the picture recognition based on the BoW method can be adopted in the process of performing picture recognition so that the required storage space for the visual dictionary can be reduced.

Moreover, in the embodiment of the present disclosure, the optical flow tracking algorithm can be initialized with the recognition result based on the BoW method. That is, the frame in which the target picture is first recognized is taken as the reference frame, and the set of matching points of the reference frame is taken as a set of 3D points with Z=0. The traditional BoW algorithm requires a large-scale storage space for visual dictionary, and the result of the traditional BoW algorithm cannot be used to initialize the optical flow tracking. The improved BoW method proposed in the embodiment of the present disclosure can reduce the storage space for the visual dictionary and thus, the result of the image recognition based on the BoW method can be used to initialize the optical flow algorithm.

It should be noted that, in the embodiment of the present application, a plurality of preset thresholds (for example, a first preset threshold to a fifth preset threshold) are mentioned, and the preset thresholds can be designed based on actual application scenarios. There are no specific restrictions on this.

In order to verify the effectiveness of the proposed algorithm, the experimental results of the algorithm based on C++ are given.

Figure 12:
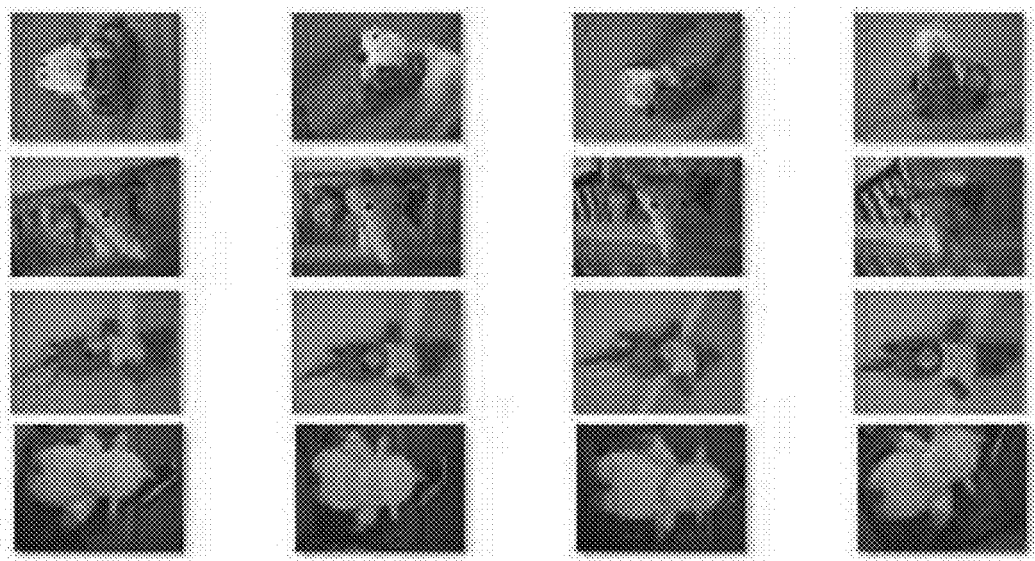
FIG. 12 illustrates an example of training picture involved in an embodiment of the present disclosure.

First, it is verified that the present disclosure is based on the recognition effect and storage performance of the BoW algorithm based on Cartesian product. Table 2 shows the compression performance of the visual dictionary of the BoW algorithm based on Cartesian product compared with the traditional BoW algorithm. It can be seen that the BoW algorithm based on Cartesian product greatly reduces the storage size and memory occupation of the visual dictionary without increasing the quantization complexity. On the other hand, the recognition results of the algorithm of the present disclosure on the small-scale image dataset were tested. We respectively selected 50, 100, and 150 pictures from the Ukbench image database for testing. The content of the pictures is shown in FIG. 12. The experimental results are shown in Table 3. It can be seen that the recognition accuracy of the algorithm of the present disclosure is lower than that of the traditional BoW algorithm, but it is still within an acceptable range. After preliminary analysis, the main reason for the decrease in recognition accuracy is that the visual dictionary of residual difference has a lower energy ratio than the original visual dictionary, and the higher the residual difference level, the lower the discriminative power of the visual dictionary, resulting in a decrease in retrieval accuracy.

Table 2

Comparative experiments of BoW, VT and the algorithm of the present disclosure, where d is the feature dimension. ORB visual features were used in the experiment, K = 10, M = 6.

| | BoW | VT | algorithm of the present disclosure |
|---|---|---|---|
| Memory and hard disk occupation | $K^M d$ | $\sum_{i=1}^{M} (K^i d)$ | MKd |
| Quantization complexity | $K^M d$ | MKd | MKd |
| Txt Format | 82MB | 138MB | 869KB |
| Bin Format | 31MB | 49MB | — |

TABLE 3

Comparison of BoW, VT and the algorithm of the present disclosure on small-scale database

| | BoW | VT | algorithm of the present disclosure |
|---|---|---|---|
| Recall@50 | 0.96 | 0.96 | 0.91 |
| Recall@100 | 0.92 | 0.93 | 0.85 |
| Recall@150 | 0.89 | 0.90 | 0.80 |

In addition, in order to verify the effectiveness of the optical flow tracking strategy based on the present disclosure, a comparison experiment with the optical flow+PNP algorithm framework is firstly designed, the relative position of the Marker point and the natural picture are fixed, and use the posture transformation to predict the position of the Marker point during the tracking process, and the position of the Marker point is detected. The errors between detection and prediction of the four corner points are compared, where i represents the i-th frame, $x_j$ represents the predicted value of the j-th corner point, and $x_d$ represents the detected value of the corresponding corner point.

$$\text{error}(i) = \frac{1}{4}\sum_{j=1}^{4}\sqrt{(x_j - x_d)^2 + (y_j - y_d)^2}. \qquad (13)$$

Figure 13:
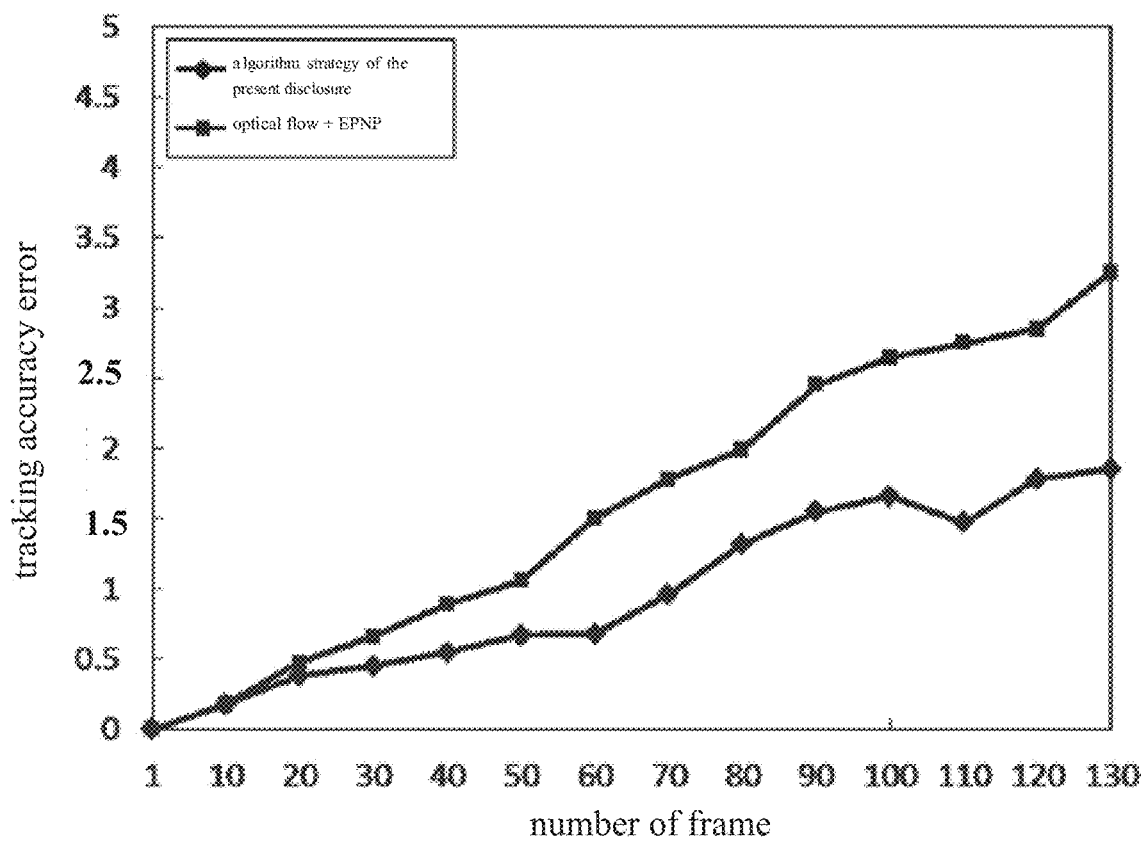
FIG. 13 shows variation of tracking accuracy error of points in the tracking processes of the algorithm of the present disclosure and of the optical flow+PNP algorithm framework.

FIG. 13 shows variation of tracking accuracy error of points in the tracking processes of the two algorithm frameworks. It can be seen that the algorithm of the present disclosure has better tracking accuracy and algorithm robustness with the tracking progresses.

Figure 14:
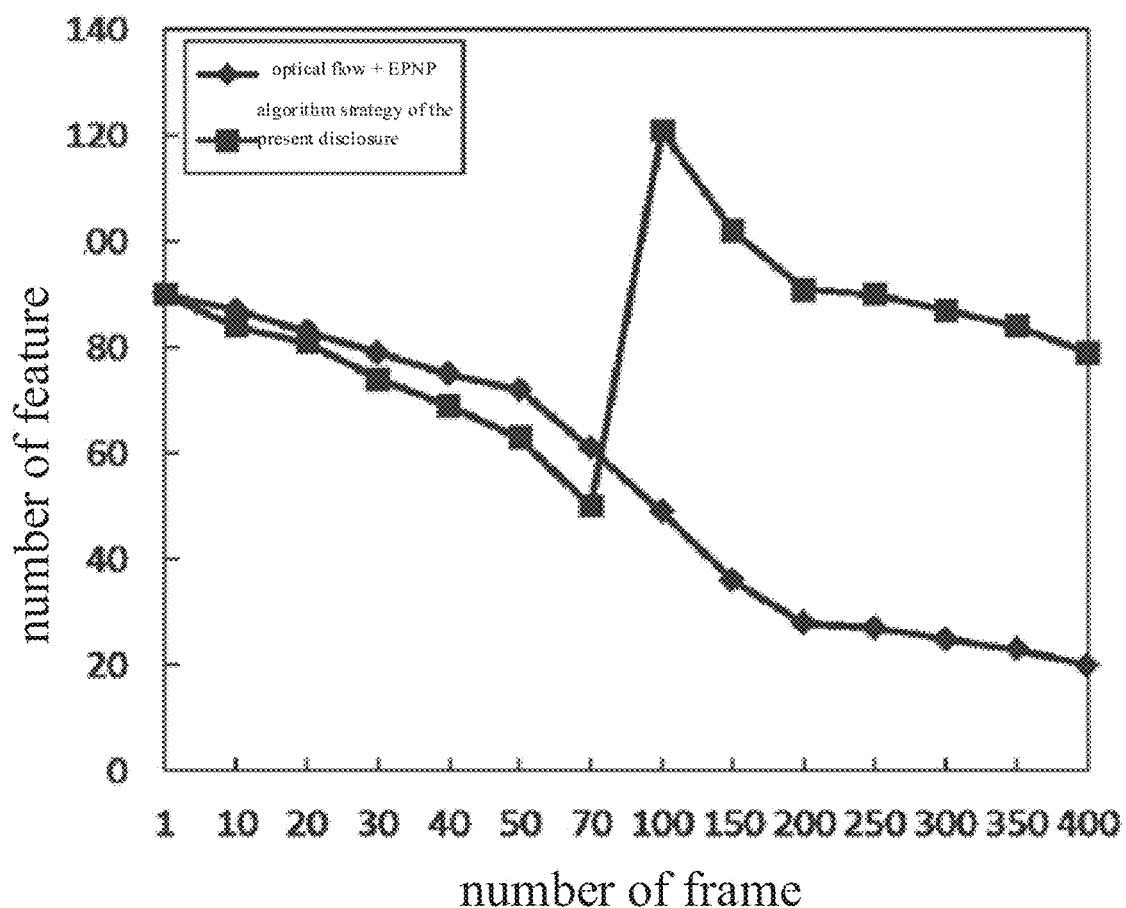
FIG. 14 shows variation of the tracking point during long-term tracking.

In fact, the algorithm of the present disclosure is still valid when tracking for a long time, especially when the target picture is temporarily and partially occluded. When the occlusion ends, enough image tracking points for the camera posture calculation are again obtained. Variations in tracking points during long-term tracking are counted. As shown in FIG. 14, the algorithm of the present disclosure can supplement the set of tracking points in time when the set of tracking points is small, thereby ensuring the stability of the tracking.

Figure 15:
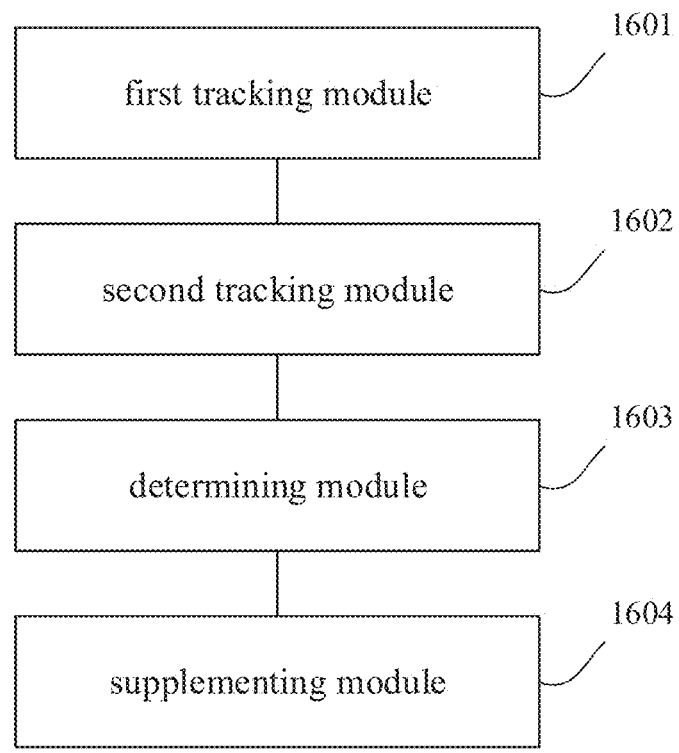
FIG. 15 illustrates a block diagram of an image processing apparatus according to an exemplary embodiment of the present disclosure.

FIG. 15 shows a block diagram of an image processing apparatus according to an exemplary embodiment of the present disclosure. The apparatus includes: a first tracking module 1601 configured to, when the current frame contains the target picture, take the current frame as a reference frame for tracking, take a set of matching points in the current frame which match the target picture as an initial set of tracking points to perform tracking of the target picture; a second tracking module 1602 configured to continue to obtain a next frame, and determine a set of tracking points of the next frame based on the initial set of tracking points; a determining module 1603 configured to determine whether the number of tracking points in the set of tracking points is less than a first preset threshold; and a supplementing module 1604 configured to, when the number of tracking points in the set of tracking points is less than the first preset threshold, determine supplementary tracking points and add the supplementary tracking points to the set of tracking points.

For the implementation process of each module in FIG. 15, reference can be made to the foregoing description of the method embodiments, and details are not described herein again. The various modules in FIG. 15 can be implemented in software, hardware, or a combination thereof.

The embodiment of the present disclosure further provides a non-transitory computer readable storage medium, which stores a computer program, and when the computer program is executed by the processor, the steps of the method provided by the embodiment of the present disclosure are implemented.

Figure 16:
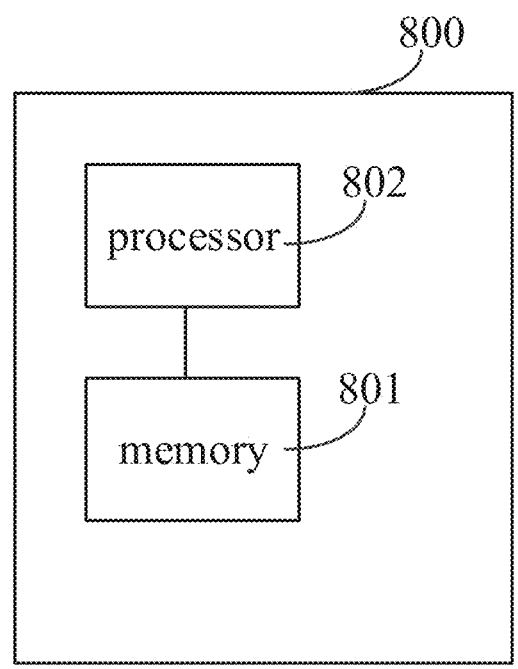
FIG. 16 illustrates a block diagram of an image processing apparatus according to an exemplary embodiment of the present disclosure.

FIG. 16 shows a block diagram of an image processing apparatus according to an exemplary embodiment of the present disclosure. The apparatus can include a memory 801 and a processor 802. Computer program instructions executable by the processor 802 are stored on the memory 801. The processor 802 executes the computer program to implement the methods described in this disclosure.

The memory 801 can be implemented in any of a variety of volatile or non-volatile storage devices, or a combination thereof, such as a static random access memory (SRAM), an electrically erasable programmable read only memory (EEPROM), an Erasable Programmable Read Only Memory (EPROM), a Programmable Read Only Memory (PROM), a Read Only Memory (ROM), a Magnetic Memory, a Flash Memory, a Disk or an Optical Disk.

The apparatus 800 can be various devices with computing and processing capabilities, and can include various input devices (e.g., user interfaces, keyboards, etc.), various output devices (e.g., speakers, etc.) in addition to the memory 801 and the processor 802, details of which will not be described herein.

It should be noted that although several modules or units of the device for action execution are mentioned in the detailed description above, but such division is not mandatory. In fact, according to embodiments of the present disclosure, the features and functions of two or more modules or units described above can be embodied in one module or unit. On the contrary, the features and functions of one of the modules or units described above can be further divided into multiple modules or units.

In addition, although the various steps of the method of the present disclosure are described in a particular order in the drawings, this is not required or implied that the steps must be performed in the specific order, or all the steps shown must be performed to achieve the desired result. Additionally or alternatively, certain steps can be omitted, multiple steps can be combined into one step, and/or one step can be decomposed into multiple step executions and the like.

The present application is intended to cover any variations, usages, or adaptive variations of the present disclosure, which are according to the general principles of the disclosure and include common general knowledge or common technical means in the art that are not disclosed in the present disclosure. The specification and examples are to be regarded as illustrative only, the true scope and spirit of the disclosure is indicated by the appended claims.

What is claimed is:

1. An image processing method, comprising:
    when a current frame contains a target picture, taking the current frame as a reference frame for tracking and taking a set of matching points in the current frame which match the target picture as an initial set of tracking points to perform tracking of the target picture;
    continuing to obtain a next frame and determining a set of tracking points of the next frame based on the initial set of tracking points by determining a set of tracking points of the next frame based on the initial set of tracking points using a pyramid optical flow algorithm, the set of tracking points of the next frame based on the initial set of tracking points being determined using the pyramid optical flow algorithm;
    determining whether a number of tracking points in the set of tracking points is less than a first preset threshold;
    when the number of tracking points in the set of tracking points is less than the first preset threshold, determining supplementary tracking points and adding the supplementary tracking points to the set of tracking points
    performing a back tracking using the pyramid optical flow algorithm to obtain a set of tracking points of the reference frame;
    determining a pixel distance between the set of matching points of the reference frame and the set of tracking points of the reference frame obtained by performing the back tracking with the pyramid optical flow algorithm; and
    when the pixel distance between one or more tracking points in the set of tracking points of the reference frame obtained by performing the back tracking with the pyramid optical flow algorithm and tracking points in the set of matching points of the reference frame is greater than a second preset threshold, deleting the tracking points in the set of tracking points of the next frame which correspond to the one or more tracking points from the set of tracking points, wherein, after the tracking points in the set of tracking points of the next frame which correspond to the one or more tracking points are deleted from the set of tracking points, the method further comprises:

determining a similarity between a tracking point in the set of tracking points of the next frame and a point in the set of matching points;

determining the tracking point has a similarity greater than a third preset threshold as a point of a successful tracking, and keeping the point of the successful tracking in the set of tracking points of the next frame; and determining the tracking point has a similarity less than or equal to the third preset threshold as the point of a failed tracking, searching for an available tracking point in a local area where the point of the failed tracking is located, and supplementing the available tracking point searched out into the set of tracking points of the next frame.

2. The image processing method according to claim 1, wherein determining the supplementary tracking points and adding the supplementary tracking points to the set of tracking points comprises:

extracting the supplementary tracking points in the next frame;

determining the supplementary tracking points inside a polygon corresponding to the target picture;

determining positions of a plurality of vertices of the target picture in the next frame;

determining a polygon surrounded by the plurality of vertices; and determining the supplementary tracking points inside the polygon surrounded by the plurality of vertices and adding the supplementary tracking points to the set of tracking points.

3. The image processing method according to claim 2, wherein determining the positions of the plurality of vertices of the target picture in the next frame comprises:

determining positions of four vertices of the target picture in the next frame; and determining a polygon surrounded by the plurality of vertices comprises, taking the upper left corner of the next frame as an origin, the lateral direction of the next frame as an x-axis, and a longitudinal direction of the next frame as a y-axis:

determining two vertices with a smallest ordinate values among the four vertices;

determining a vertex with a smaller abscissa value among the two vertices having the smallest ordinate values as a first vertex, and the vertex with a larger abscissa value among the two vertices having the smallest ordinate values as a second vertex;

determining the two vertices with a largest ordinate values among the four vertices; and determining the vertex with the smaller abscissa value among the two vertices having the largest ordinate values as a third vertex, and the vertex with the larger abscissa value among the two vertices having the largest ordinate values as a fourth vertex; and determining a quadrilateral surrounded by the first vertex, the second vertex, the third vertex, and the fourth vertex.

4. The image processing method according to claim 1, wherein the supplementary tracking points are added to the set of tracking points, the method further comprises:

calculating a posture transformation of the next frame and the target picture according to the set of tracking points; and filtering final posture transformation results with a Kalman filtering.

5. The image processing method according to claim 1, wherein searching for the available tracking point in the local area where the point of the failed tracking is located comprises:

searching for a point having a local matching score satisfies a fourth preset threshold in the local area where the point of the failed tracking is located;

when the point having the local matching score satisfies the fourth preset threshold is searched out, determining the point having the local matching score satisfies the fourth preset threshold as the available tracking point;

when the point having the local matching score satisfies the fourth preset threshold is not searched out, determining whether the point of the failed tracking is a corner point; and when the point of the failed tracking is the corner point, supplementing the point of the failed tracking into the set of tracking points of the next frame.

6. The image processing method according to claim 1, wherein after the tracking points in the set of tracking points of the next frame which correspond to the one or more tracking points are deleted from the set of tracking points, the method further comprises:

for the point of the successful tracking in the set of tracking points of the next frame, which is determined by the pyramid optical flow algorithm based on the initial set of tracking points, determining a number of successful tracking times of the point of the successful tracking; and deleting the point of the successful tracking having the number of successful tracking times exceeding a fifth threshold from the set of tracking points.

7. The image processing method according to claim 2, wherein determining supplementary tracking points and adding the supplementary tracking points to the set of tracking points further comprises:

when the target picture is stationary with respect to a background, supplementing the set of tracking points with the supplementary tracking points outside the polygon.

8. The image processing method according to claim 1, wherein before tracking of the target picture is performed, the method further comprises:

performing a picture recognition on the current frame to determine whether the current frame contains the target picture; and after determining the supplementary tracking points and adding the supplementary tracking points to the set of tracking points, if the number of tracking points in a supplemented set of tracking points is still less than the first preset threshold, continuing to obtain an image frame for image recognition to determine whether the image frame contains the target picture.

9. The image processing method according to claim 2, wherein, before the tracking of the target picture is performed, the method further comprises:

performing picture recognition on the current frame to determine whether the current frame contains the target picture; and after determining supplementary tracking points and adding the supplementary tracking points to the set of tracking points, if the number of tracking points in the supplemented set of tracking points is still less than the first preset threshold, continuing to obtain an image frame for image recognition to determine whether the image frame contains the target picture.

10. The image processing method according to claim 8, wherein performing the picture recognition on the current frame to determine whether the current frame contains the target picture further comprises:
    extracting visual features of the current frame;
    determining a bag of word vector of a visual feature of the current frame based on a predetermined number of visual dictionaries;
    determining a similarity between the bag of word vector of the current frame and the bag of word vector of the target picture; and
    determining whether the current frame contains the target picture based on a degree of the determined similarity.

11. The image processing method according to claim 10, wherein determining the bag of word vector of the visual feature of the current frame based on the predetermined number of visual dictionaries comprises:
    determining an index of each visual feature of the current frame based on the predetermined number of visual dictionaries;
    determining a word frequency-inverse document frequency weight of the index of each visual feature of the current frame; and
    generate the bag of word vector of the current frame based on the word frequency-inverse document frequency weight of the index of each visual feature.

12. The image processing method according to claim 11, wherein determining the index of each visual feature of the current frame based on the predetermined number of visual dictionaries comprises:
    determining, from the predetermined number of visual dictionaries, a plurality of visual words that are closest to the visual feature of the current frame, a number of the plurality of visual words being the same as the number of visual dictionaries; and
    determining the index of each visual feature of the current frame based on indices of the plurality of visual words.

13. An image processing apparatus, comprising:
    a first tracking module configured to, when a current frame contains a target picture, take the current frame as a reference frame for tracking and take a set of matching points in the current frame which match the target picture as an initial set of tracking points to perform tracking of the target picture;
    a second tracking module configured to continue to obtain a next frame and determine a set of tracking points of the next frame based on the initial set of tracking points, wherein the second tracking module is further configured to determine a set of tracking points of the next frame based on the initial set of tracking points using a pyramid optical flow algorithm, wherein the set of tracking points of the next frame based on the initial set of tracking points is determined using the pyramid optical flow algorithm;
    a determining module configured to determine whether a number of tracking points in the set of tracking points is less than a first preset threshold;
    a supplementing module configured to, when the number of tracking points in the set of tracking points is less than the first preset threshold, determine supplementary tracking points and add the supplementary tracking points to the set of tracking points;
    the image processing apparatus further comprises a module configured to:
    perform a back tracking with the pyramid optical flow algorithm to obtain a set of tracking points of the reference frame;
    determine a pixel distance between the set of matching points of the reference frame and the set of tracking points of the reference frame obtained by performing the back tracking with the pyramid optical flow algorithm; and
    when the pixel distance between one or more tracking points in the set of tracking points of the reference frame obtained by performing the back tracking with the pyramid optical flow algorithm and tracking points in the set of matching points of the reference frame is greater than a second preset threshold, delete the tracking points in the set of tracking points of the next frame which correspond to the one or more tracking points from the set of tracking points,
    wherein, after the tracking points in the set of tracking points of the next frame which correspond to the one or more tracking points are deleted from the set of tracking points, the image processing apparatus further comprises a module configured to:
    determine a similarity between a tracking point in the set of tracking points of the next frame and a point in the set of matching points;
    determine the tracking point has a similarity greater than a third preset threshold as a point of a successful tracking, and keep the point of the successful tracking in the set of tracking points of the next frame; and
    determine the tracking point has a similarity less than or equal to the third preset threshold as the point of a failed tracking, search for an available tracking point in a local area where the point of the failed tracking is located, and supplement the available tracking point searched out into the set of tracking points of the next frame.

14. An image processing apparatus, comprising:
    at least one hardware processor; and
    a memory storing program instructions executable by the at least one hardware processor that, when executed, direct the at least one hardware processor to:
    when a current frame contains a target picture, take the current frame as a reference frame for tracking and take a set of matching points in the current frame which match the target picture as an initial set of tracking points to perform tracking of the target picture;
    obtain a next frame and determine a set of tracking points of the next frame based on the initial set of tracking points;
    determine whether a number of tracking points in the set of tracking points is less than a first preset threshold;
    when the number of tracking points in the set of tracking points is less than the first preset threshold, determine supplementary tracking points and add the supplementary tracking points to the set of tracking points;
    determine a set of tracking points of the next frame based on the initial set of tracking points with a pyramid optical flow algorithm,
    wherein the set of tracking points of the next frame based on the initial set of tracking points is determined using the pyramid optical flow algorithm, the program instructions, when executed, further direct the at least one hardware processor to:

perform a back tracking with the pyramid optical flow algorithm to obtain a set of tracking points of the reference frame;

determine a pixel distance between the set of matching points of the reference frame and the set of tracking points of the reference frame obtained by performing the back tracking with the pyramid optical flow algorithm; and when the pixel distance between one or more tracking points in the set of tracking points of the reference frame obtained by performing the back tracking with the pyramid optical flow algorithm and tracking points in the set of matching points of the reference frame is greater than a second preset threshold, delete the tracking points in the set of tracking points of the next frame which correspond to the one or more tracking points from the set of tracking points, wherein, after the tracking points in the set of tracking points of the next frame which correspond to the one or more tracking points are deleted from the set of tracking points, the program instructions, when executed, further direct the at least one hardware processor to:

determine a similarity between a tracking point in the set of tracking points of the next frame and a point in the set of matching points;

determine the tracking point has a similarity greater than a third preset threshold as a point of a successful tracking, and keep the point of the successful tracking in the set of tracking points of the next frame; and determine the tracking point has a similarity less than or equal to the third preset threshold as the point of a failed tracking, search for an available tracking point in a local area where the point of the failed tracking is located, and supplement the available tracking point searched out into the set of tracking points of the next frame.

15. The image processing apparatus according to claim 14, wherein determining the supplementary tracking points and adding the supplementary tracking points to the set of tracking points comprises:

extracting the supplementary tracking points in the next frame;

determining the supplementary tracking points inside a polygon corresponding to the target picture;

determining positions of a plurality of vertices of the target picture in the next frame;

determining the polygon surrounded by the plurality of vertices; and determining the supplementary tracking points inside the polygon and adding the supplementary tracking points to the set of tracking points.

16. The image processing apparatus according to claim 15, wherein determining the positions of the plurality of vertices of the target picture in the next frame comprises:

determining the positions of four vertices of the target picture in the next frame; and determining the polygon surrounded by the plurality of vertices comprises, taking an upper left corner of the next frame as an origin, a lateral direction of the next frame as an x- axis, and a longitudinal direction of the next frame as a y-axis:

determining two vertices with a smallest ordinate values among the four vertices;

determining a vertex with a smaller abscissa value among the two vertices having the smallest ordinate values as a first vertex, and the vertex with a larger abscissa value among the two vertices having the smallest ordinate values as a second vertex;

determining the two vertices with a largest ordinate values among the four vertices;

determining the vertex with the smaller abscissa value among the two vertices having the largest ordinate values as a third vertex, and the vertex with the larger abscissa value among the two vertices having the largest ordinate values as a fourth vertex; and determining a quadrilateral surrounded by the first vertex, the second vertex, the third vertex, and the fourth vertex.

17. The image processing apparatus according to claim 14, wherein the supplementary tracking points are added to the set of tracking points, the at least one hardware processor is further directed to:

calculating a posture transformation of the next frame and the target picture according to the set of tracking points; and filtering final posture transformation results with a Kalman filtering.

* * * * *